US007039472B2

(12) United States Patent
Sugimoto et al.

(10) Patent No.: US 7,039,472 B2
(45) Date of Patent: May 2, 2006

(54) SCHEDULE EXECUTION MANAGING APPARATUS AND METHOD

(75) Inventors: Yuichiro Sugimoto, Kawasaki (JP); Akira Hayakawa, Unoke-machi (JP)

(73) Assignee: Fujitsu Limited, Kawasaki (JP)

( * ) Notice: Subject to any disclaimer, the term of this patent is extended or adjusted under 35 U.S.C. 154(b) by 336 days.

(21) Appl. No.: 09/814,071

(22) Filed: Mar. 22, 2001

(65) Prior Publication Data

US 2002/0062157 A1 May 23, 2002

(30) Foreign Application Priority Data

Nov. 17, 2000 (JP) ...................................... 2000-351839

(51) Int. Cl.
*G05B 11/01* (2006.01)

(52) U.S. Cl. ........................... 700/14; 700/16; 713/500; 713/502

(58) Field of Classification Search ................. 713/400, 713/401, 500, 502; 714/55; 700/14, 16, 100, 700/306, 11, 23; 718/102, 107; 709/103
See application file for complete search history.

(56) References Cited

U.S. PATENT DOCUMENTS

| | | | | | |
|---|---|---|---|---|---|
| 4,819,191 | A | * | 4/1989 | Scully et al. | 345/751 |
| 5,010,482 | A | * | 4/1991 | Keller et al. | 710/52 |
| 5,177,684 | A | * | 1/1993 | Harker et al. | 701/117 |
| 5,251,122 | A | * | 10/1993 | Sakamoto et al. | 700/18 |
| 5,487,170 | A | * | 1/1996 | Bass et al. | 710/244 |
| 5,555,179 | A | * | 9/1996 | Koyama et al. | 700/95 |
| 5,636,124 | A | * | 6/1997 | Rischar et al. | 700/100 |
| 5,768,572 | A | * | 6/1998 | George et al. | 713/502 |
| 5,838,957 | A | * | 11/1998 | Rajaraman et al. | 713/502 |
| 5,951,619 | A | * | 9/1999 | Merl et al. | 701/115 |
| 5,954,792 | A | * | 9/1999 | Balarin | 709/102 |
| 6,081,090 | A | * | 6/2000 | Takaki et al. | 318/567 |
| 6,131,093 | A | * | 10/2000 | Maruyama et al. | 707/8 |
| 6,154,735 | A | * | 11/2000 | Crone | 706/45 |
| 6,304,891 | B1 | * | 10/2001 | Anderson et al. | 718/107 |
| 6,480,878 | B1 | * | 11/2002 | Mason et al. | 709/102 |

FOREIGN PATENT DOCUMENTS

| | | |
|---|---|---|
| JP | 6-52182 | 2/1994 |
| JP | 9-73313 | 3/1997 |

OTHER PUBLICATIONS

Palencia, J.C.; Gonzalez Harbour M., "Schedulability analysis for tasks with static and dynamic offsets," Real–Time Systems Symposium, 1998. Proceedings., The 19th IEEE, Dec. 2–4, 1998, pp. 26–37.*

Tindell, K., "Adding Time–Offsets to Schedulability Analysis", Technical Report YCS 221, Dept. of Computer Science, Universit of York, England, Jan. 1994.*

Bate, I.; Burns, A., "An approach to task attribute assignment for uniprocessor systems," Real–Time Systems, 1999, Proceedings of the 11th Euromicro Conference, York, UK, pp. 46–53.*

Palencia, J.C.; Harbour, M.G., "Exploiting precedence relations in the schedulability analysis of distributed real–time systems," Real–Time Systems Symposium, 1999. Proceedings. The 20th IEEE, Dec. 1–3, 1999, pp. 328–339.*

Tindell, K., "Holistic Schedulability Analysis for Distributed Hard Real–Time Systems," Microprocessing & Microprogramming, vol. 50, Nos. 2–3, Apr. 1994, pp. 117–134.*

* cited by examiner

*Primary Examiner*—JungWon Chang
*Assistant Examiner*—Aaron Perez-Daple
(74) *Attorney, Agent, or Firm*—Staas & Halsey LLP

(57) ABSTRACT

A schedule execution managing apparatus comprises a planned start time setting unit setting the planned start time of a schedule in correspondence with a predetermined base time and an offset from the base time, a planned start time storing unit storing the set planned start time, and a schedule execution controlling unit controlling the execution start of the schedule by referencing the contents stored in the planned start time storing unit. With this apparatus, a schedule change in an emergency is facilitated, and schedule information can be easily reused in a different environment.

14 Claims, 20 Drawing Sheets

-

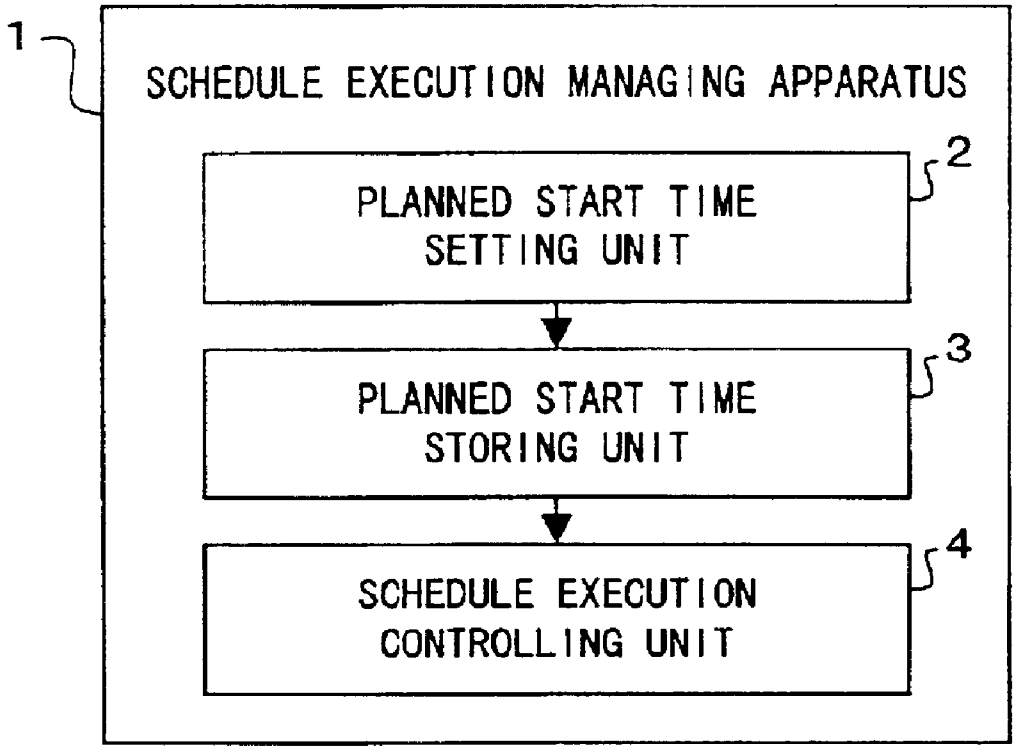
F I G. 1

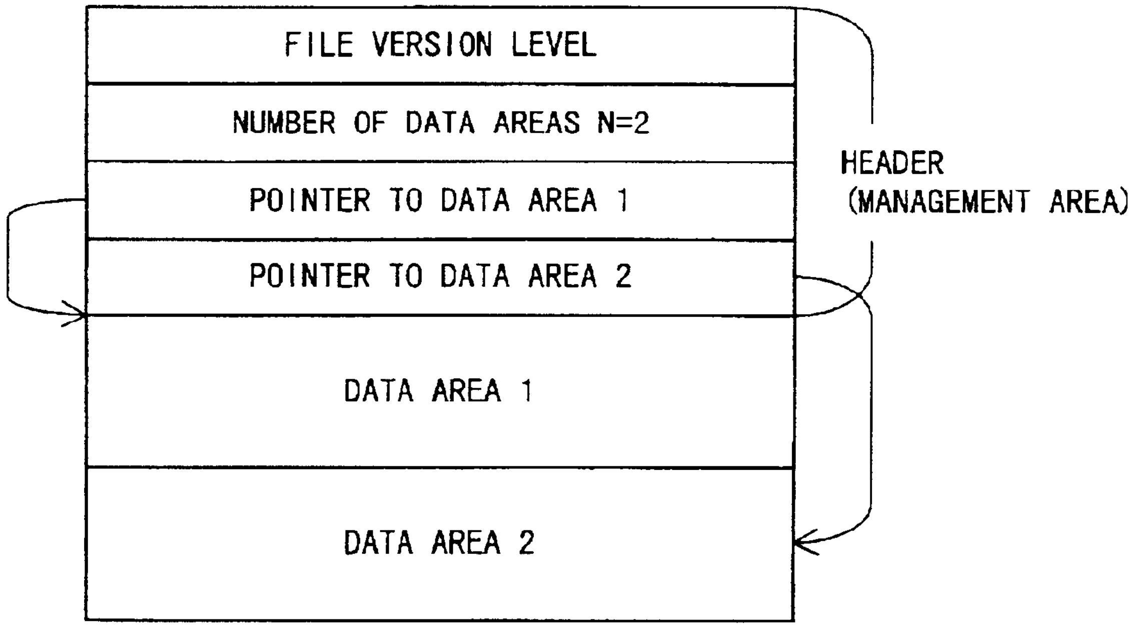
F I G. 5

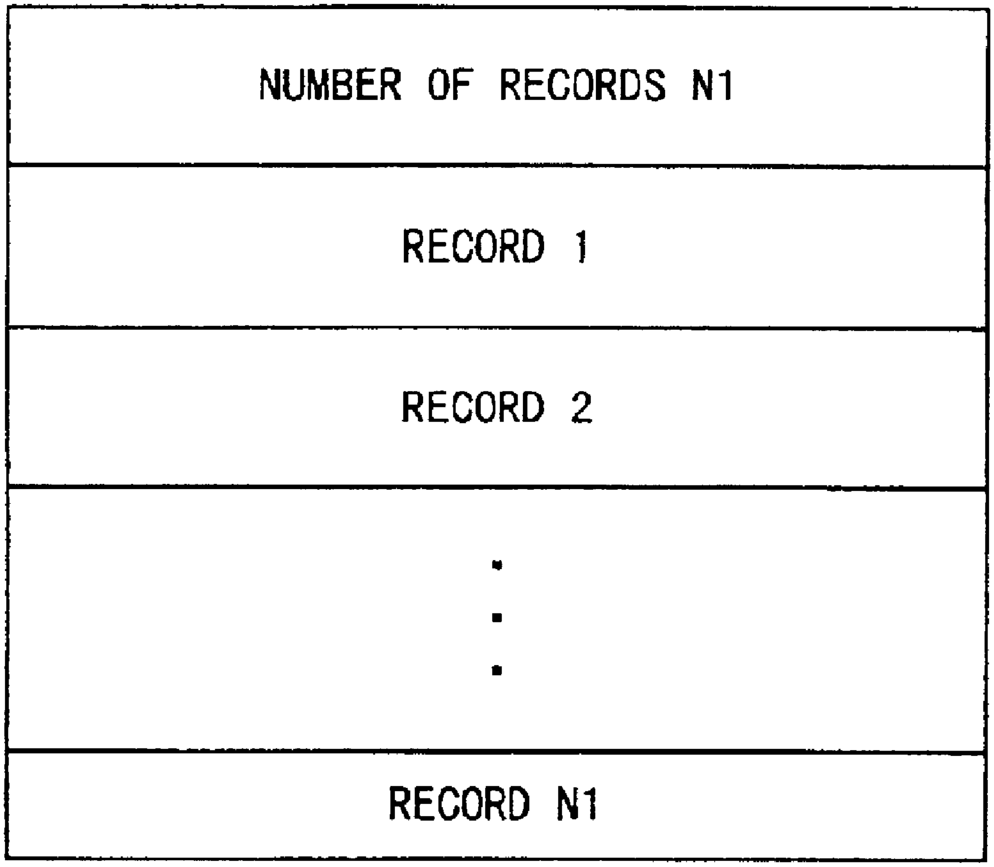
F I G. 6

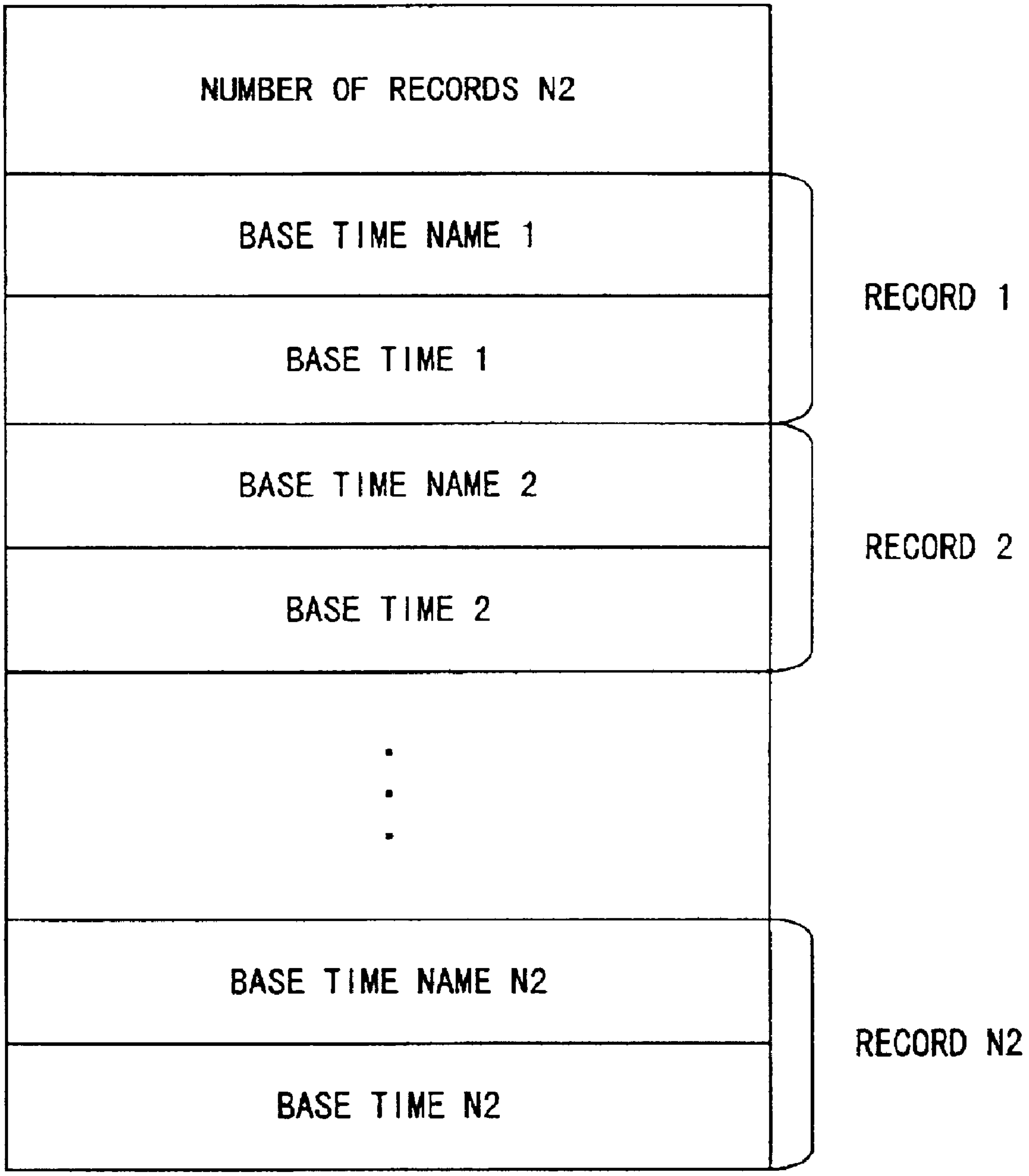
F I G. 8

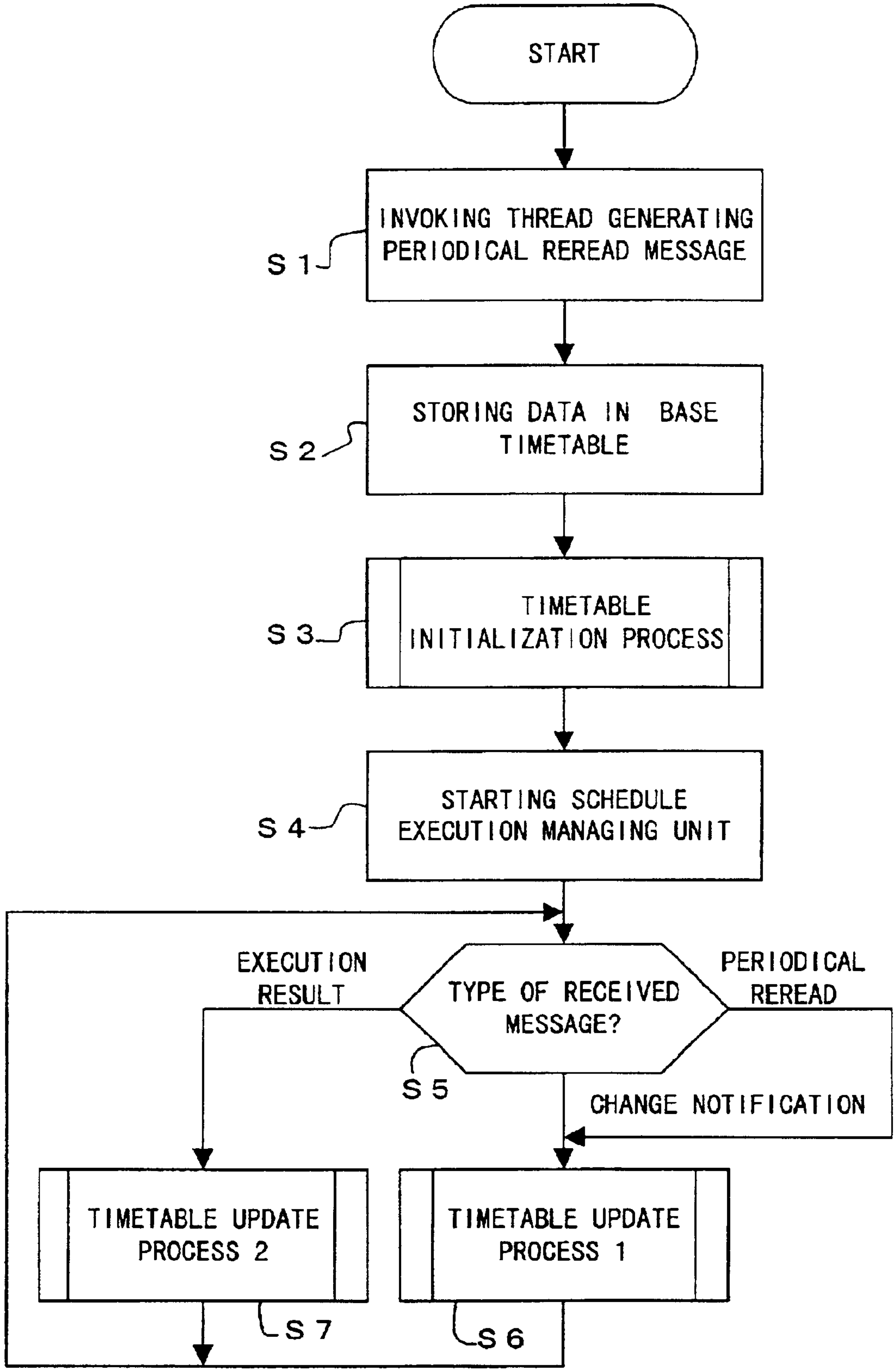
F I G. 1 0

| SCHEDULE NAME | TIME SPECIFICATION CLASSIFICATION | DEPENDENCY SOURCE SCHEDULE NAME | BASE TIME NAME | OFFSET |
|---|---|---|---|---|
| S1 | ABSOLUTE TIME SPECIFICATION | NONE | NONE | 19:00 |
| S2 | ABSOLUTE TIME SPECIFICATION | S1 | NONE | 19:40 |
| S3 | BASE TIME SPECIFICATION | NONE | B1 | 00:20 (offset) |
| S4 | BASE TIME SPECIFICATION | S1 | B1 | 00:40 (offset) |
| S5 | RELATIVE TIME SPECIFICATION | S3 | NONE | 00:40 (offset) |
| S6 | BASE TIME SPECIFICATION | NONE | B1 | 00:00 (offset) |

FIG. 16

| BASE TIME NAME | BASE TIME |
|---|---|
| B1 | 18:00 |

FIG. 17

| | S1 | S2 | S3 | S4 | S5 | S6 |
|---|---|---|---|---|---|---|
| 17:50 | A | B | A | B | B | A |
| 18:00 (B1) | A | B | A | B | B | C |
| 18:10 | A | B | A | B | B | D |
| 18:20 | A | B | C | B | B | D |
| 18:30 | A | B | D | B | B | E |
| 18:40 | A | B | D | B | B | |
| 18:50 | A | B | E | B | A | |
| 19:00 | C | B | | B | A | |
| 19:10 | D | B | | B | C | |
| 19:20 | D | B | | B | D | |
| 19:30 | E | A | | C | D | |
| 19:40 | | C | | D | E | |
| 19:50 | | D | | D | | |
| 20:00 | | D | | E | | |
| 20:10 | | E | | | | |

A: WAITING TO BE EXECUTED
B: WAITING FOR DEPENDENCY SOURCE SCHEDULE TERMINATION
C: START
D: DURING EXECUTION
E: TERMINATION

FIG. 18

| | S1 | S2 | S3 | S4 | S5 | S6 |
|---|---|---|---|---|---|---|
| 17:50 | A | B | A | B | B | A |
| 18:00 | A | B | A | B | B | A |
| 18:10 | A | B | A | B | B | A |
| 18:20 | A | B | A | B | B | A |
| 18:30 | A | B | A | B | B | A |
| 18:40 | A | B | A | B | B | A |
| 18:50 | A | B | A | B | B | A |
| 19:00 (B1) | C | B | A | B | B | C |
| 19:10 | D | B | A | B | B | D |
| 19:20 | D | B | C | B | B | D |
| 19:30 | E | A | D | A | B | E |
| 19:40 | | C | D | C | B | |
| 19:50 | | D | E | D | A | |
| 20:00 | | D | | D | A | |
| 20:10 | | E | | E | C | |
| 20:20 | | | | | D | |
| 20:30 | | | | | D | |
| 20:40 | | | | | E | |

A: WAITING TO BE EXECUTED
B: WAITING FOR DEPENDENCY SOURCE SCHEDULE TERMINATION
C: START
D: DURING EXECUTION
E: TERMINATION

FIG. 19

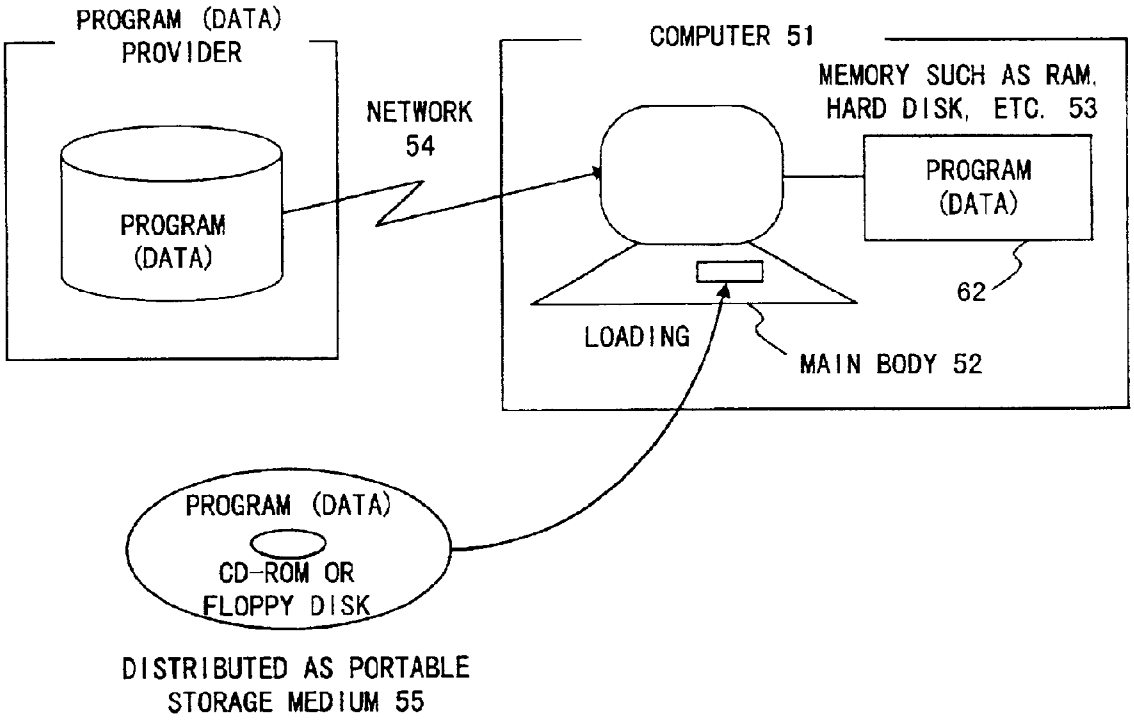
F I G. 2 0

SCHEDULE EXECUTION MANAGING APPARATUS AND METHOD

BACKGROUND OF THE INVENTION

1. Field of the Invention

The present invention relates to a schedule execution managing apparatus, method and system, that is, a schedule execution managing apparatus managing the execution of one or more schedules by using a time or a different condition as a trigger, and more particularly, to a schedule execution managing apparatus and method that facilitates a schedule change in an emergency and allows a schedule definition to be easily reused in a different environment.

2. Description of the Related Art

It is assumed that a schedule targeted by the present invention is defined as a combination of the content of a job and its planned start time information. If a plurality of contents of jobs are executed in parallel under the management of a schedule execution managing apparatus according to the present invention, each of the jobs belongs to a particular schedule. Namely, a plurality of schedules normally run in parallel.

With a conventional system for such schedule execution, for example, "every day", "every week", "specified date", etc., can be specified as a schedule execution day, but a start time is specified with an absolute time.

Additionally, although a particular schedule can be manually executed in an emergency, a schedule associated with the executed schedule cannot be made to run by automatically changing its start time.

Furthermore, a schedule A can be executed by setting a predetermined time interval after a schedule B is terminated. However, there is no method changing the start time of the schedule A so as to set a predetermined time interval in synchronization with a change in the start time or in the execution time of the schedule B.

A first problem in such a conventional technique is the lack of flexibility in an emergency. Namely, if a plurality of schedules correlate to one another, and if the start time of each of the schedules is specified with an absolute time, associated schedules must be manually extracted, and the start times of all of the schedules must be manually reset when the start time of any of the schedules must be urgently changed.

Also, if reuse of schedule information is desired in a different environment, for example, under which an operation time is different, other than in an emergency, the start time must be manually set.

A second problem is that there is a difficulty associated with a change in the start time of the schedule B on which the schedule A has a dependency. On the premise that the schedule A has a dependency on the schedule B, and is started after a predetermined amount of time elapses from the termination point of the schedule B, the start time of the schedule A cannot be automatically changed while maintaining the above described execution interval if the start time or the execution time of the schedule B is changed.

SUMMARY OF THE INVENTION

An object of the present invention is to provide a schedule execution managing apparatus and method that facilitates a schedule change in an emergency, and allows schedule information to be easily reused in a different environment so as to overcome the above described problems.

According to one preferred embodiment of the present invention, a schedule execution managing apparatus managing the execution of one or more schedules comprises a planned start time setting unit, a planned start time storing unit, and a schedule execution controlling unit.

The planned start time setting unit sets the planned start time of a schedule in correspondence with a base time predetermined for each schedule, and an offset from the base time. The planned start time storing unit stores the planned start time set by the planned start time setting unit. The schedule execution controlling unit controls the start of each schedule based on the planned start time stored in the planned start time storing unit.

The above described configuration may further comprise a planned start time changing unit changing the planned start times of a group of schedules using a changed base time as a base time in correspondence with the base time after being changed and an offset from the base time when the base time is changed, and rewriting the planned start times stored in the planned start time storing unit. With this configuration, the start times of schedules being a group using the same base time as a criterion of the planned start times can be changed by altering only the base time of the group of schedules.

According to another preferred embodiment of the present invention, a schedule execution managing apparatus may comprise another planned start time setting unit the operations of which are different from those of the above described planned start time setting unit. In this case, the planned start time setting unit sets the planned start time of a schedule in correspondence with the end time of a different schedule having a dependency on the schedule and an offset from the end time. The operations of the planned start time storing unit and the schedule execution controlling unit are the same as those stated earlier.

The above described configuration may further comprise a planned start time changing unit changing the planned start time of a schedule in correspondence with the end time of a different schedule and an offset from the end time, and rewriting the planned start time stored in the planned start time storing unit, if the end time of the different schedule having a dependency on the schedule is changed.

With this configuration, the end time of a schedule is only changed, so that the start time of a different schedule having a dependency on the schedule can be changed. As a result, a schedule change in an emergency can be easily made.

According to a further preferred embodiment of the present invention, a schedule execution managing method managing the execution of one or more schedules comprises: setting the planned start time of a schedule in correspondence with a base time and an offset from the base time; storing the set planned start time; and controlling the start of the schedule by referencing the stored planned start time.

The above described method may further comprise: resetting the planned start times of a group of schedules using a changed base time as a base time in correspondence with the base time after being changed and an offset when the base time is changed; storing the reset planned start times; and controlling the execution starts of the schedules by referencing the stored planned start times. Also with this configuration, the above described problems can be overcome.

According to a still further preferred embodiment of the present invention, a schedule execution managing method managing the execution of one or more schedules comprises: setting the planned start time of a schedule in correspondence with the end time of a different schedule having a dependency on the schedule and an offset from the end time; storing the set planned start time; and controlling the execution start of the schedule by referencing the stored planned start time.

The above described method may further comprise: resetting the planned start time of a schedule in correspondence with an end time after being changed and an offset from the end time when the end time of a different schedule having a dependency on the schedule is changed; storing the reset planned start time; and controlling the execution start of the schedule by referencing the stored planned start time. Also with this configuration, the above described problems can be overcome.

According to a still further preferred embodiment, a computer-readable storage medium on which is recorded a program for causing a computer to perform a process for managing the execution of one or more schedules, said control process comprising: setting the planned start time of a schedule in correspondence with a base time and an offset from the base time; storing the set planned start time; and controlling the execution start of the schedule by referencing the stored planned start time.

According to a still further preferred embodiment, a computer-readable storage medium on which is recorded a program for causing a computer to perform a process for managing the execution of one or more schedules, said process comprising: setting the planned start time of a schedule in correspondence with the end time of a different schedule having a dependency on the schedule and an offset from the end time; storing the set planned start time; and controlling the start of the schedule by referencing the stored planned start time.

As described above, according to the present invention, the planned start time of a schedule is set in correspondence with a predetermined base time and an offset from the base time, or in correspondence with the end time of a different schedule having a dependency on the schedule and an offset from the end time.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 1 is a block diagram showing the principle of a configuration according to the present invention;

FIG. 5 shows the entire structure of a storage area of a schedule information file;

FIG. 6 exemplifies a data area 1 of the schedule information file, that is, a storage form of a schedule table;

FIG. 8 exemplifies the storage form of a base time information table;

FIG. 10 is a flowchart showing the entire processing performed by a request processing unit;

FIG. 16 exemplifies schedules;

FIG. 17 exemplifies the base time information table;

FIG. 18 shows the execution progress of schedules;

FIG. 19 shows the execution progress of schedules when a base time is changed; and FIG. 20 explains the loading of a program according to the present invention into a computer.

DESCRIPTION OF THE PREFERRED EMBODIMENTS

FIG. 1 is a block diagram showing the principle of a configuration according to the present invention. This figure is a block diagram showing the principle of the configuration of a schedule execution managing apparatus managing the parallel execution, etc., of one or more, normally, a plurality of schedules. A schedule execution managing apparatus 1 comprises a planned start time setting unit 2, a planned start time storing unit 3, and a schedule execution controlling unit 4.

The planned start time setting unit 2 is, for example, a request processing unit of the schedule execution managing apparatus, and intended to set the planned start time of a schedule in correspondence with a predetermined base time and an offset from the base time.

The planned start time storing unit 3 is, for example, a timetable, and intended to store the planned start time set by the planned start time setting unit 2.

The schedule execution controlling unit 4 is, for example, a schedule execution managing unit, and intended to control the execution start of a schedule by referencing the contents stored in the planned start time storing unit 3.

The preferred embodiment according to the present invention may further comprise a planned start time changing unit changing the planned start times of a group of schedules using a changed base time as a base time in correspondence with the base time after being changed and an offset from the base time when the predetermined base time is changed, and rewriting the planned start times stored in the planned start time storing unit 3.

The schedule execution managing apparatus according to the present invention may comprise a planned start time setting unit the operations of which are different from those of the above described planned start time setting unit.

A block diagram of its configuration is the same as that shown in FIG. 1. However, the planned start time setting unit 2 sets the planned start time of a schedule in correspondence with the end time of a different schedule having a dependency on the schedule and an offset from the end time.

The planned start time storing unit 3 stores a planned start time set as described above. The schedule execution controlling unit 4 controls the execution start of a schedule by referencing the contents stored in the planned start time storing unit 3 in a similar manner.

The preferred embodiment according to the present invention may further comprise a planned start time changing unit changing the planned start time of a schedule having a dependency on a different schedule in correspondence with an end time after being changed and an offset from the end time, when the end time of the different schedule is changed, and rewriting the planned start time stored in the planned start time storing unit 3.

Figure 2:
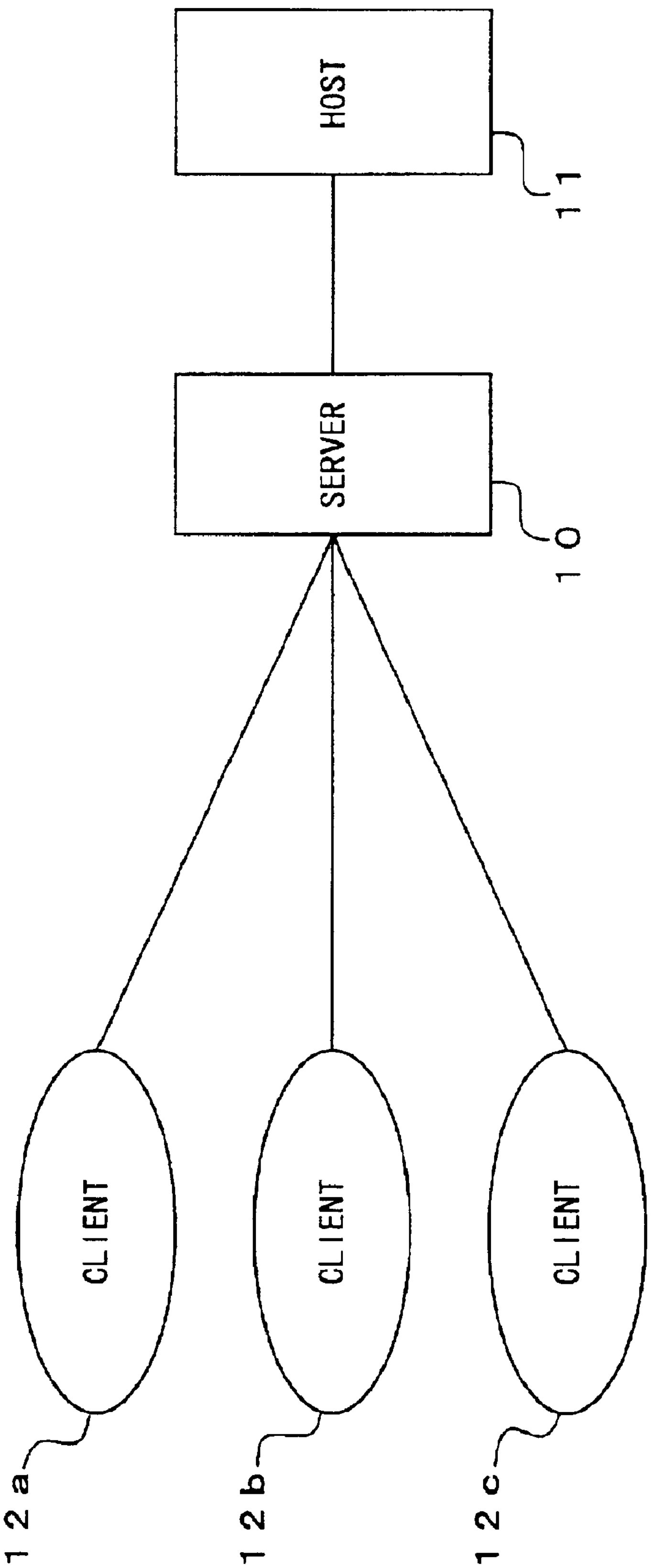
FIG. 2 exemplifies the configuration of a schedule execution managing system for implementing the present invention.

FIG. 2 exemplifies one configuration of a schedule execution managing system to which a schedule execution managing apparatus according to the present invention is applied. In this figure, a server 10 fundamentally acts as the schedule execution managing apparatus according to the present invention. A host (computer) 11 and a plurality of clients 12*a* through 12*c* are connected to the server 10.

The server 10 executes, for example, a schedule A upon request of a client side, establishes a communications path to the host 11, issues a process request, and releases the communications path to the host 11. The host 11 processes this request for a predetermined amount of processing time.

The server 10 starts a schedule B after a predetermined amount of time, that is, a time interval sufficient for processing the request on the host 11 side elapses from the end time of the schedule A, reestablishes a communications path to the host 11, receives a process execution result, and returns the result to the client side.

If a schedule A must be terminated before the execution of a schedule B is started, the schedule A is referred to as a dependency source schedule of the schedule B in this specification. By specifying A as the dependency source schedule of B, it becomes possible to stop the execution start of the schedule B (dependency destination schedule) until the schedule A is terminated.

Figure 3:
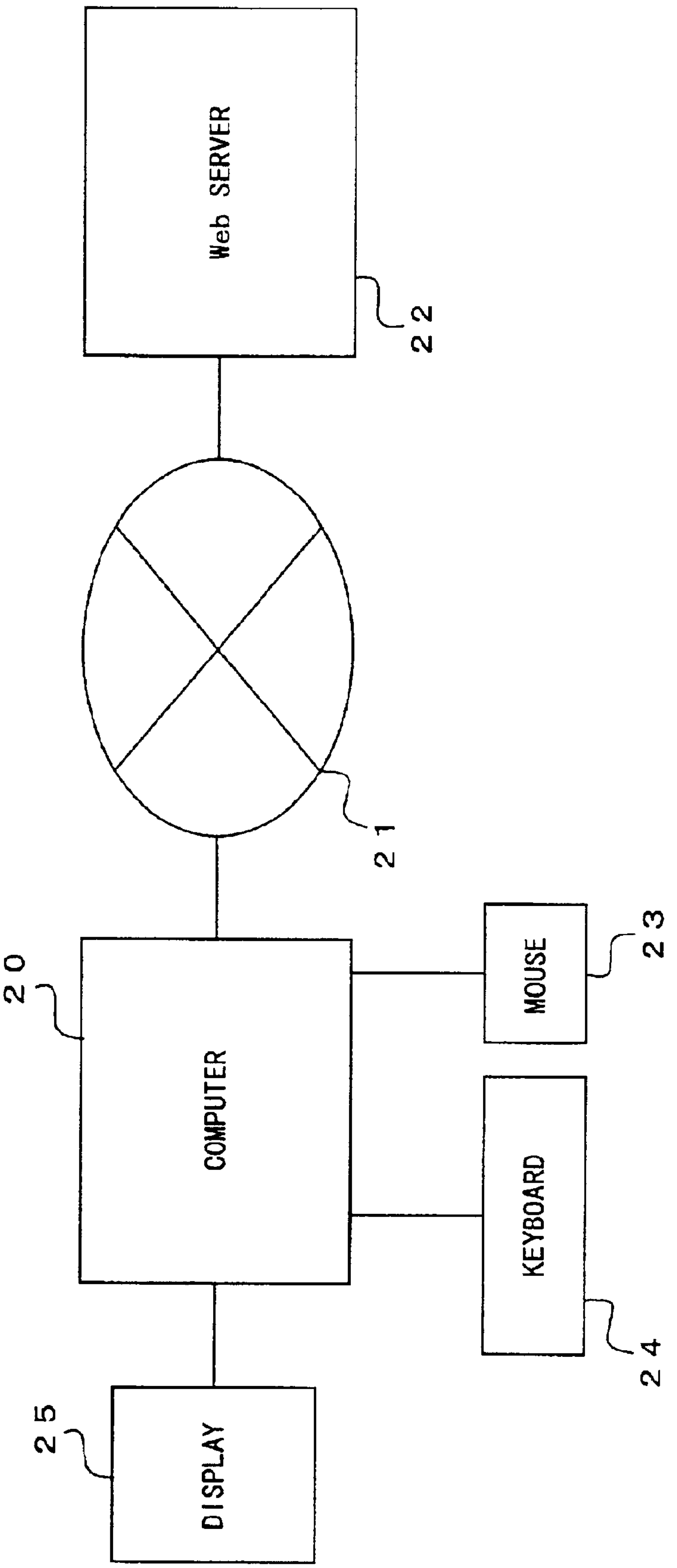
FIG. 3 exemplifies another configuration of the schedule execution managing system for implementing the present invention.

FIG. 3 exemplifies another configuration of a schedule execution managing system to which the schedule execution managing apparatus according to the present invention is applied. In this figure, a computer 20 is connected to a Web server 22 via a network 21. A mouse 23, a keyboard 24, and a display 25 are connected to the computer 20.

In FIG. 3, the computer 20 establishes a communications path to the Web server 22, for example, during the night and obtains data, and a user views the data according to a schedule B when the morning comes. If schedules A and B perform only processes closed within the computer 20, a stand-alone computer that is not connected to a network is available as the computer 20.

According to the present invention, two specification methods such as a base time specification method, a relative time specification method may be used as a method specifying the start time of a schedule in addition to the conventional absolute time specification method.

With the base time specification method, a particular time is used as a base time, to which a name, namely, a base time name is given, so that the base time can be registered along with an absolute time. The planned start time of a schedule can be specified by using the base time name and an offset time from the base time.

With the relative time specification method, the planned start time of a schedule can be specified based on a dependency source schedule name and an offset time from the end time of the dependency source schedule.

Figure 4:
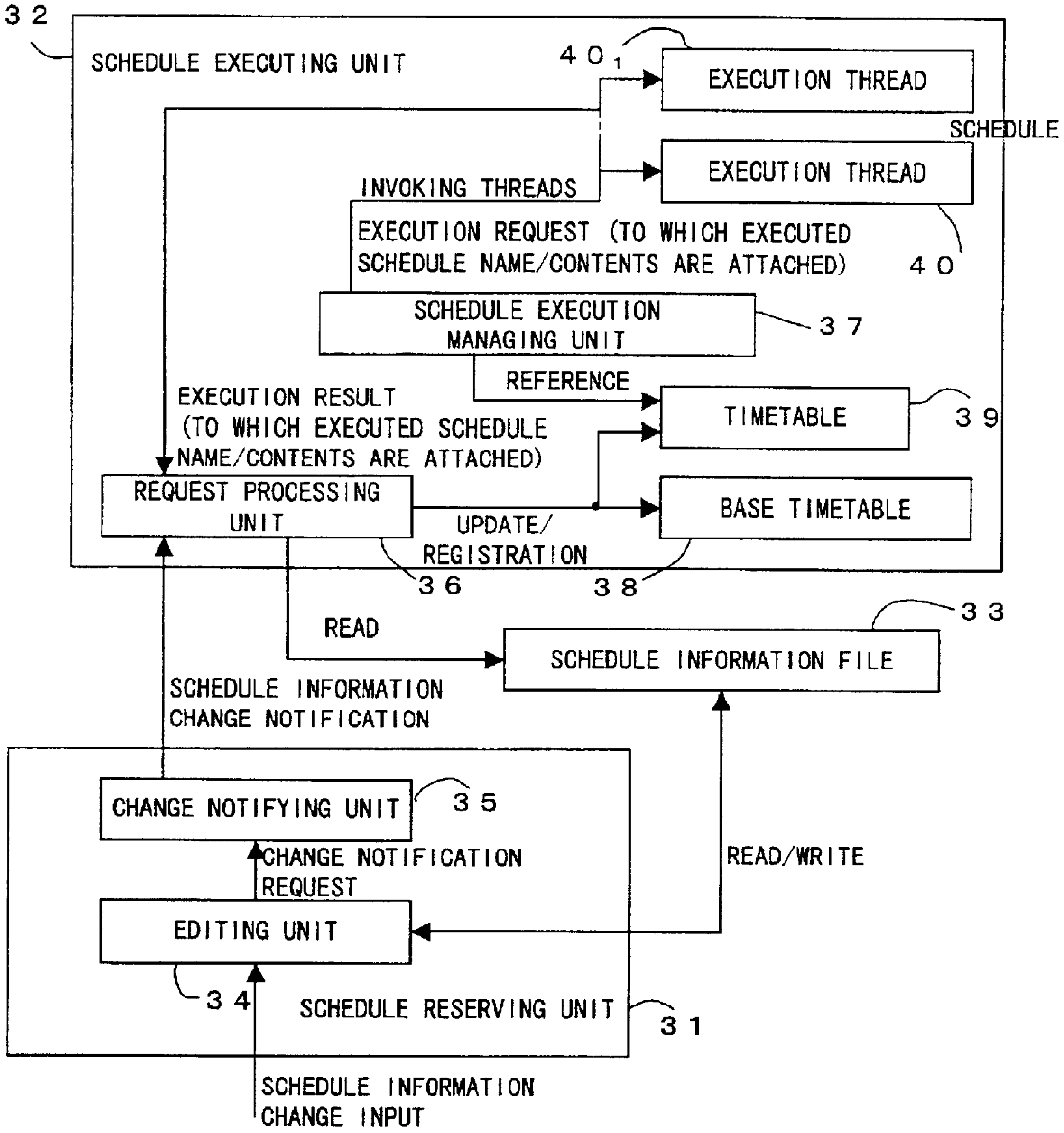
FIG. 4 is a block diagram showing the fundamental configuration of a schedule execution managing apparatus according to the present invention.

FIG. 4 is a block diagram showing the fundamental configuration of a schedule execution managing apparatus. In this figure, the schedule execution managing apparatus is fundamentally configured by a schedule reserving unit 31, a schedule executing unit 32, and a schedule information file 33.

In FIG. 4, the schedule reserving unit 31 corresponds to, for example, a non-resident program invoked on demand within the server 10 shown in FIG. 2, and is configured by an editing unit 34 editing the information of a schedule, and a change notifying unit 35 notifying the schedule executing unit 32 of a schedule information change.

The schedule executing unit 32 corresponds to, for example, a resident program that can be executed at any time while the power of the server 10 is turned on. The schedule executing unit 32 is configured by: a request processing unit 36 calculating the planned start time of a schedule in correspondence with, for example, a schedule information change notification from the schedule reserving unit 31; a schedule execution managing unit 37 managing the execution of a a schedule, a base timetable 38 storing a base time name and a corresponding base time; a timetable 39 storing the planned start time of a schedule, which is calculated by the request processing unit 36; and threads $\mathbf{40}_1$ through $\mathbf{40}_n$ executing the contents of a schedule under the management of the schedule execution managing unit 37.

In this preferred embodiment, schedules are updated by the schedule executing unit 32 so that also a change in a base time or in the end time of a dependency source schedule can be dynamically coped with.

Its first fundamental process is an automatic schedule update accompanying a change in the contents of the schedule information file 33. If the contents of the schedule information file 33, for example, a base time is changed, the schedule executing unit 32 converts the start time information specified by a base time name and an offset into actual time information when the schedule information change notification is received from the schedule reserving unit 32, or when the schedule information is reread periodically.

The second fundamental process is a process for changing the start time of a schedule (dependency destination schedule) upon termination of a dependency source schedule. The schedule executing unit 32 executes the process for automatically calculating the planned start time of a dependency destination schedule when detecting the termination of the dependency source schedule, and for registering the calculated time to the timetable 39.

The process of the schedule reserving unit 31 is further described below. First of all, the editing unit 34 comprises a base time setting unit and a schedule setting unit, which are not shown in FIG. 4. The base time setting unit stores a pair of a base time name and a corresponding base time in the schedule information file 33, when the pair is input, for example, from a user.

The schedule setting unit stores input information in the schedule information file 33 according to the selection of a schedule specification method and necessary information input, which are made by the user. If an absolute time is first specified, this is input as a start time.

If a base time is specified, for example, the base time name set by the base time setting unit is selected, and an offset time from the base time is input from a user. If a relative time is specified, the name of a schedule currently registered to the schedule information file 33 is selected as a dependency source schedule, and an offset time from the end time of the dependency source schedule is input.

After editing schedule information, the editing unit 34 issues a change notification request to the change notifying unit 35 to notify the schedule executing unit 32 of the schedule information change. Upon receipt of the request, the change notifying unit 35 transmits a schedule information change notification to the request processing unit 36 within the schedule executing unit 32.

The processes of the schedule executing unit 32 are performed by the request processing unit 36, the schedule execution managing unit 37, and the plurality of execution threads $\mathbf{40}_1$ through $\mathbf{40}_n$. The processes of the request processing unit 36 will be described later by using flowcharts. Here, their outlines are explained.

The request processing unit 36 performs the processes, for example, by receiving a message of the schedule information change notification from the schedule reserving unit 31. Such a message is logged for an analysis if a problem occurs later. The reason is that the outline of a performed process is grasped by tracing the flow of messages. For example, also the times at which the threads $\mathbf{40}_1$ to $\mathbf{40}_n$ are invoked by the schedule execution managing unit 37 are logged depending on need.

The processes of the request processing unit 36 are fundamentally classified into three types. The first process is a process performed when the schedule executing unit 32 itself is started. The schedule executing unit 32 is started, for example, when the power of the server 10 shown in FIG. 2 is turned on as described above. Also the request processing unit 36 is simultaneously started as a matter of course. The request processing unit 36 reads the contents of the schedule information file 33, stores base time information among the read contents in the base timetable 38, registers the name, etc. of a schedule planned to be executed on the same day to the timetable 39, and starts the schedule execution managing unit 37.

The second process of the request processing unit 36 is a process performed when the schedule information file 33 is periodically reread, or when a schedule information change notification is received. The request processing unit 36 rereads the schedule information file 33, for example, once in a day, or reads the schedule information file 33 upon receipt of the schedule information change notification from the schedule reserving unit 31. With the second process, the contents of the base timetable 38 are updated, and at the same time, a record corresponding to each schedule stored in the timetable 39 is updated on demand.

The third process of the request processing unit 36 is a process performed when a schedule execution result is received from the execution threads. The execution threads $\mathbf{40}_1$ through $\mathbf{40}_n$ are invoked by the schedule execution managing unit 37. They transmit the name and the end time of an executed schedule to the request processing unit 36 in addition to an execution result when the schedule requested to be executed is terminated.

Upon receipt of the execution result, the request processing unit 36 updates the contents of the record corresponding to the name of the executed schedule, and calculates the planned start time of the record for which the schedule having the name of the executed schedule is specified as a dependency source schedule.

Here, a planned start time calculation method is explained. If time specification classification is absolute time specification, an offset value is defined as a planned start time. If the time specification classification is base time specification, a corresponding base time is referenced from the base timetable 38 by using a base time name as a key. The base time and an offset are added and defined as a planned start time. If the time specification classification is relative time specification, an offset is added to the end time of a dependency source schedule, so that the planned start time is obtained.

The schedule execution managing unit 37 shown in FIG. 4 references the timetable 39 periodically, for example, every 30 seconds or every minute. If the state, which will be described later, of a schedule is "waiting to be executed", and its start time is already past at a current time, the schedule execution managing unit 37 changes the state of this schedule to "during execution", invokes the execution threads, and issues an execution request to which the name and the contents of the schedule are attached.

The execution threads $\mathbf{40}_1$ through $\mathbf{40}_n$ execute the schedule that the schedule execution managing unit 37 requests to execute, transmit to the request processing unit 36 an execution result to which the name and the end time of the executed schedule are attached upon completion of the execution, and terminate the operations.

Contents stored in the schedule information file 33, the base timetable 38, and the timetable 39, which are shown in FIG. 4, will be explained. FIG. 5 shows the entire contents stored in the schedule information file 33. In this figure, schedule information is fundamentally composed of three areas such as a management area as a header, a data area 1, and a data area 2. The management area as a header stores the version level of a file, the number of data areas N (2 in this case), and pointers pointing to the respective data areas.

The data area 1 is an area for storing data corresponding to each schedule, and referred to as a schedule table. Contents stored in this area will be described later. The data area 2 is an area for storing a base time name and a base time as a pair, and referred to as a base time information table.

FIG. 6 explains the details of the data area 1 shown in FIG. 5. In the data area 1, that is, the schedule table, records are stored for respective schedules. Assuming that the number of schedules, namely, the number of records is N1, the number of records N1 is stored at the beginning of the table, and N1 records are stored next.

Figure 7:
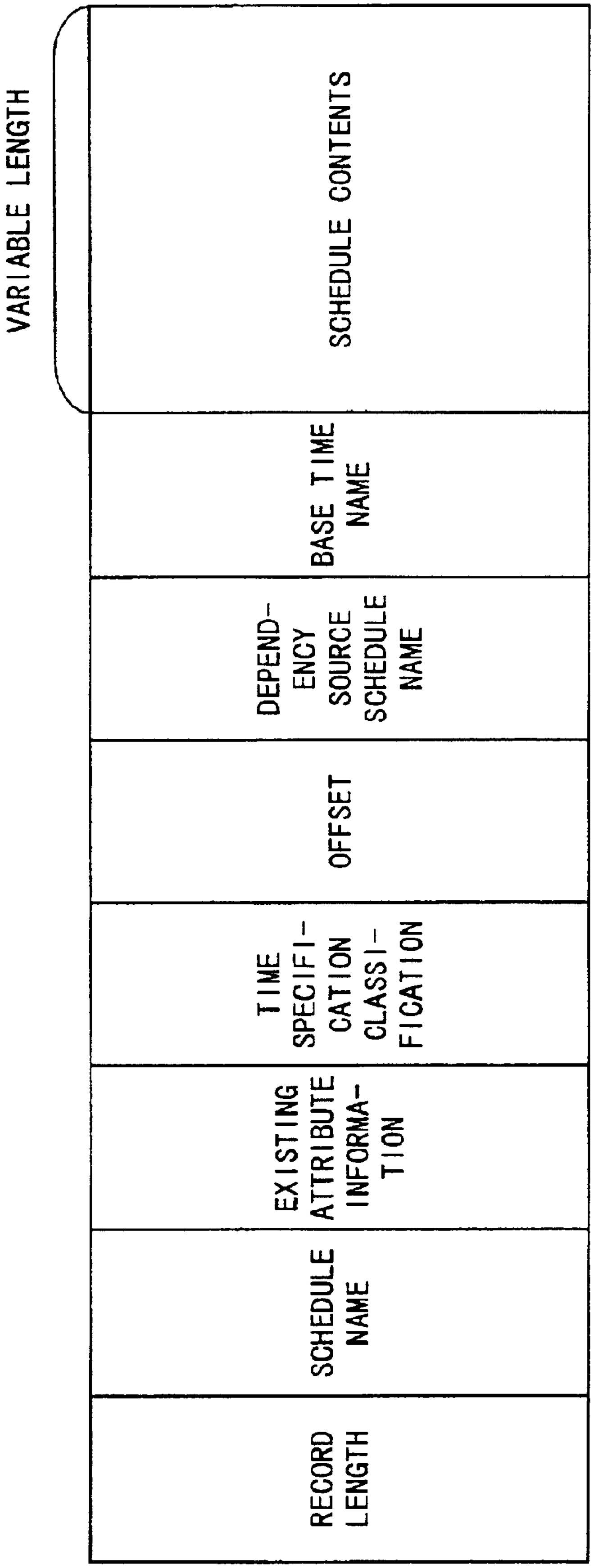
FIG. 7 exemplifies the contents stored in a record in the schedule table.

FIG. 7 shows the details of the contents stored in each record shown in FIG. 6, namely, the record corresponding to each schedule in the schedule table. A record length is stored at the beginning of the record. This is because the contents of a schedule, which will be described later, have a variable length. Next, a schedule name is stored, and existing attribute information is stored subsequently to the schedule name. The existing attribute information is attribute data such as "daily execution", "specified date execution", etc.

Next, time specification classification is stored. This is intended to specify any of the above described absolute time specification, base time specification, and relative time specification. As an offset stored next, an absolute time is stored if the time specification classification is the absolute time specification, an offset from a base time if the time specification classification is the base time specification, and an offset from the end time of a dependency source schedule if the time specification classification is the relative time specification.

As a dependency source schedule name stored next, a dependency source schedule is specified if it exists. This specification is essential for the relative time specification. Next, a base time name is the name of a base time used for the base time specification. Schedule contents stored last are the specific contents of execution of a schedule. The length of the schedule contents varies depending on each schedule as a matter of course.

FIG. 8 exemplifies the contents stored in the data area 2 shown in FIG. 5, that is, the base time information table. The number of records N2 as base times is stored at the beginning of the table, and N2 records each storing a base time name and a base time as a pair are stored next. Here, the base time name is a name given to the base time referenced in correspondence with a schedule for which the base time specification is made. As the base time, an absolute time is specified.

Contents stored in the base timetable 38 shown in FIG. 4 are the same as those of the data area 2, namely, the base time information table explained by referencing FIG. 8. That is, upon receipt of the schedule information change notification from the schedule reserving unit 31, the request processing unit 36 reads the contents of the data area 2 within the schedule information file 33, and stores the read contents in the base timetable 38 as described above.

The data storage format of the timetable 39 shown in FIG. 4 is fundamentally the same as that of the data area 1, namely, the schedule table explained by referencing FIG. 6 except for a partial difference in the contents of a record.

Figure 9:
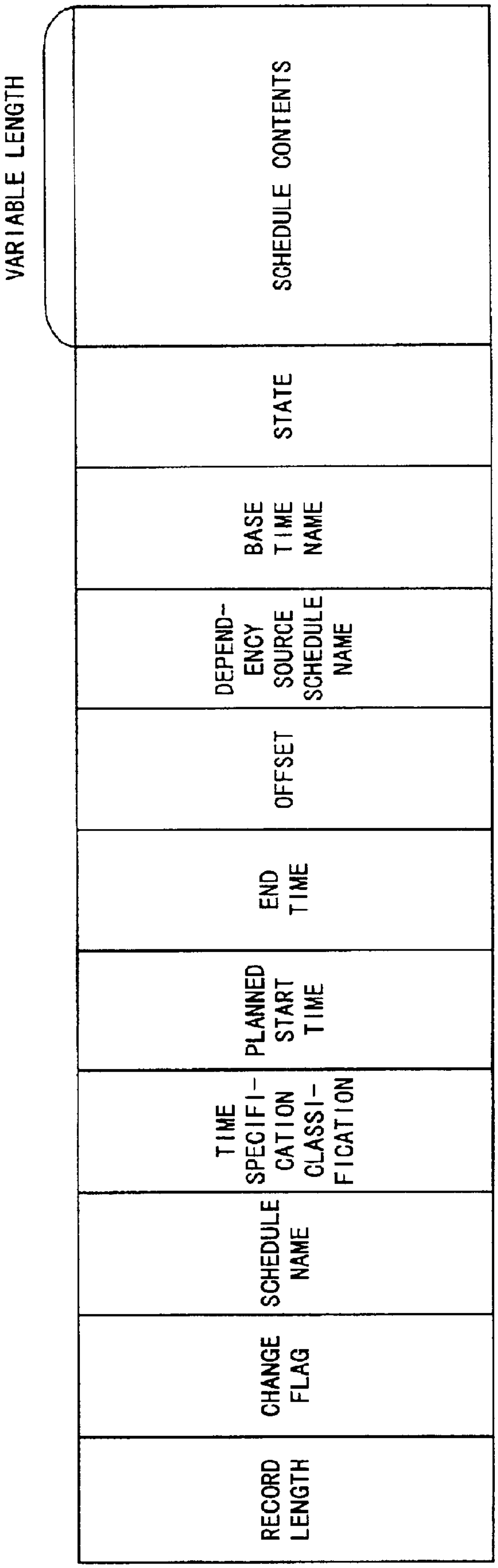
FIG. 9 exemplifies the contents stored in a record in the timetable.

FIG. 9 exemplifies the contents stored in one record of the timetable 39, that is, a record corresponding to each schedule. Because the stored contents are similar to those of the record in the schedule table shown in FIG. 7, only different portions are described here.

First of all, a change flag is stored next to a record length in FIG. 9. This is a flag for deleting a record that is currently stored in the timetable 39 and whose execution is no longer required, for example, when the request processing unit 36 periodically rereads the contents of the schedule information file 33, and stores in the timetable 39 the record corresponding to the schedule planned to be executed on the same day.

As a planned start time, the fixed planned start time of a schedule is stored when the schedule information file 33 is read if a dependency source schedule is not specified, or when the dependency source schedule is terminated if it is specified. If the dependency source schedule is specified and has not been terminated yet, a value indicating "unfixed" is stored as the planned start time.

As an end time, the end time of a schedule is stored. For the relative time specification, this is referenced when the start time of a dependency destination schedule is determined by adding the end time of a dependency source schedule and an offset upon termination of the dependency source schedule. As a state, the value indicating any of "waiting to be executed", "waiting for dependency source schedule termination", "during execution", and "termination" is stored. "waiting to be executed" is a state where the execution start of a schedule is waited, and its planned start time is fixed with an absolute time when a dependency source schedule does not exist or the dependency source schedule is terminated. "waiting for dependency source schedule termination" is a state where the termination of a dependency source schedule is waited. "during execution" is a state where a schedule is being executed by the execution threads. "termination" is a state where the execution of a schedule has been completed.

For accesses to the above described schedule information file 33, base timetable 38, and timetable 39, an exclusive process must be performed as occasion demands. Namely, for an access to the schedule information file 33, the exclusive process must be performed between the schedule reserving unit 31 and the schedule executing unit 32. For accesses to the base timetable 38 and the timetable 39, the exclusive process must be performed between the request processing unit 36 and the schedule execution managing unit 37.

This exclusive process can be implemented by using a synchronization object not shown in FIG. 4. By way of example, both of the schedule reserving unit 31 and the schedule executing unit 32 can reference the synchronization object. A unit that obtains an access right to the synchronization object acquires an access right, for example, to the schedule information file 33, and releases the right after making an access to the file. The synchronization object enters a non-signal state when either of the schedule reserving unit 31 and the schedule executing unit 32 accesses the schedule information file 33. One of the units is locked until the other releases the synchronization object, makes the object enter a signal state. Such an exclusive control can be implemented by using the exclusive capability of an OS file system.

Next, the processes of the request processing unit 36 shown in FIG. 4 will be described in detail by using the flowcharts shown in FIGS. 10 through 15. FIG. 10 is a flowchart showing the entire processing performed by the request processing unit 36. This processing is started, for example, when the power of the server 10 shown in FIG. 2 is turned on as described above.

Once the processing is started in FIG. 10, a thread for generating a periodical reread message not shown in FIG. 4 is invoked in step S1. This step is intended to invoke a thread providing the request processing unit 36 with a message for reading the contents of the schedule information file 33, for example, once in a day. It is not always necessary to invoke such a thread for a periodical reread. By way of example, a time may be continuously monitored, and the request processing unit 36 itself may perform a periodical reread at the time when the reread must be performed. However, this preferred embodiment assumes that such a thread is invoked, and a periodical reread is performed upon receipt of the message from the invoked thread.

In FIG. 10, data is stored in the base timetable 38 in step S2. Namely, the contents of the base time information table stored in the data area 2 of the schedule information file 33 are read and stored in the base timetable 38 unchanged.

Then, in step S3, an initialization process for the timetable 39 is performed. This process will be described by referencing FIG. 11. In step S4, the schedule execution managing unit 37 is started, and thereafter, message reception is continuously monitored, for example, until the power is turned off.

When the request processing unit 36 receives a message, the type of the received message is determined in step S5. If the received message is a message from the thread which is invoked in step S1 and generates a periodical reread message, or if the received message is a message of the schedule information change notification received from the schedule reserving unit 31, a timetable update process 1 is performed in step S6. The processes in and after step S5 are then repeated.

If the received message is a message of the execution result notification from the execution threads, a timetable update process 2 is performed in step S7. The processes in and after step S5 are then repeated. The timetable update processes 1 and 2 will be described in detail by referencing FIGS. 14 and 15.

Figure 11:
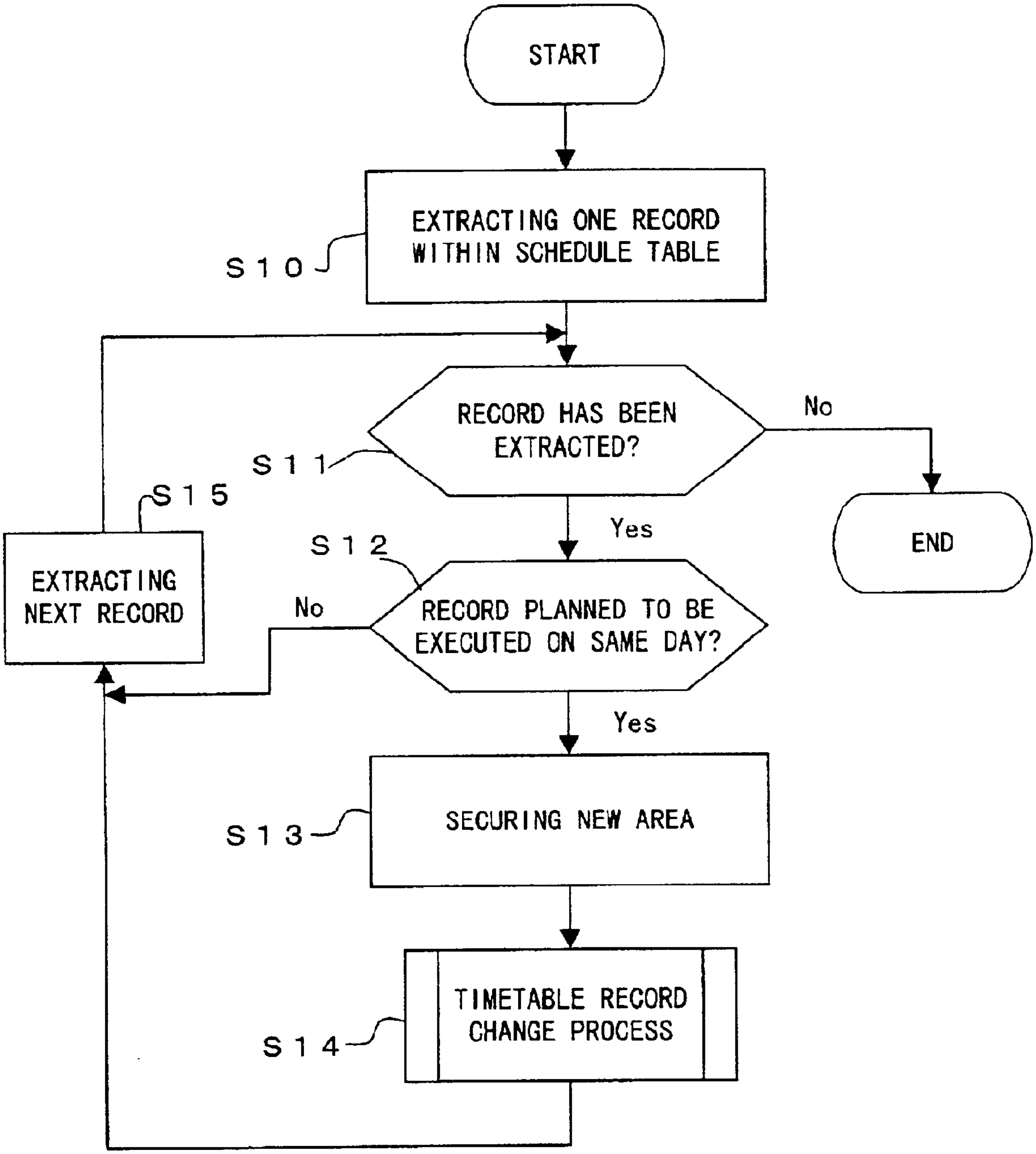
FIG. 11 is a flowchart showing the details of a timetable initialization process.

FIG. 11 is a flowchart showing the details of step S3 shown in FIG. 10, that is, the timetable initialization process. Once the process is started in this figure, the initial record is extracted from the schedule table, that is, the data area 1 of the schedule information file 33 in step S10. Next, it is determined whether or not the record has been extracted in step S11. If the record has been extracted, it is then determined whether or not the schedule of the extracted record is planned to be executed on the same day according to the contents of the above described existing attribute information in step S12. If the schedule is planned to be executed on the same day, a new area is secured for this record in the timetable in step S13, and a timetable record change process is performed in step S14. This process will be described by referencing FIG. 12.

Upon termination of the timetable record change process, the next record is extracted from the schedule table in step S15. The processes in and after step S11 are then repeated. If it is determined that the extracted record is not the record planned to be executed on the same day in step S12, the processes in and after step S15 are repeated without performing the processes in steps S13 and S14. If it is determined that the record is not extracted, that is, all of the records stored in the schedule table have been processed in step S11, the timetable initialization process is terminated.

Figure 12:
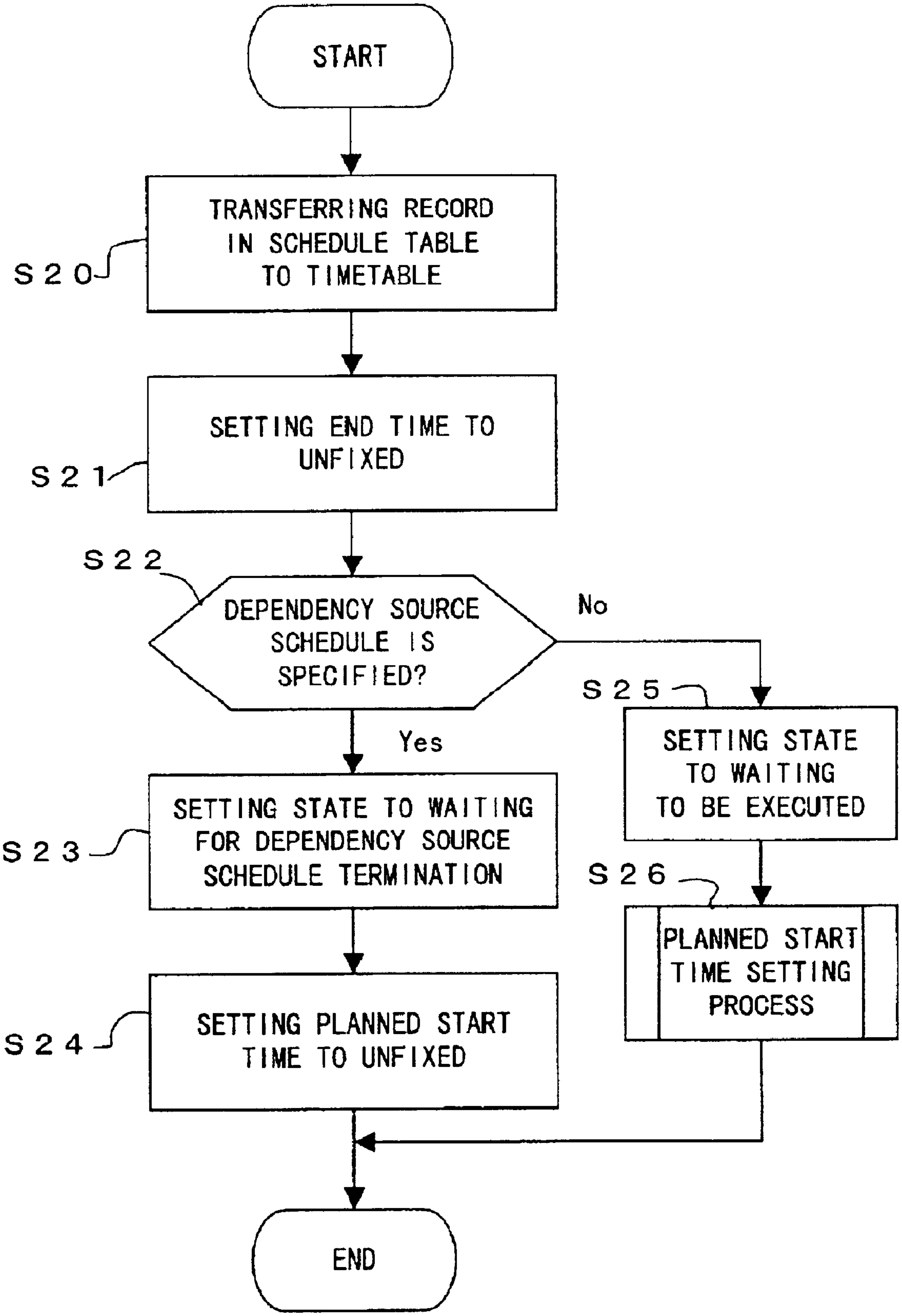
FIG. 12 is a flowchart showing the details of a timetable record change process.

FIG. 12 is a flowchart showing the details of step S14 shown in FIG. 11, namely, the timetable record change process. Performed here is a process for transferring data that can be transferred unchanged within the contents of a record in the schedule table to the record storage area newly secured in the timetable in step S13 of FIG. 11, and for storing the transferred data as a new record.

Once the process is started in FIG. 12, data of the schedule table such as a schedule name, time specification classification, etc., which can be transferred unchanged, are transferred as the contents of a record in the timetable in step S20. The end time of the record in the timetable is set to "unfixed" in step S21. Then, it is determined whether or not a dependency source schedule is specified in step S22.

If it is determined that the dependency source schedule is specified, the state of the record in the timetable is set to "waiting for dependency source schedule termination" in step S23, and the planned start time is set to "unfixed" in step S24. Here, the process is terminated. If it is determined that the dependency source schedule is not specified in step S22, the state of the record is set to "waiting to be executed" in step S25, and a planned start time setting process is performed in step S26. Here, the process is terminated. The planned start time setting process will be explained next by referencing FIG. 13.

Figure 13:
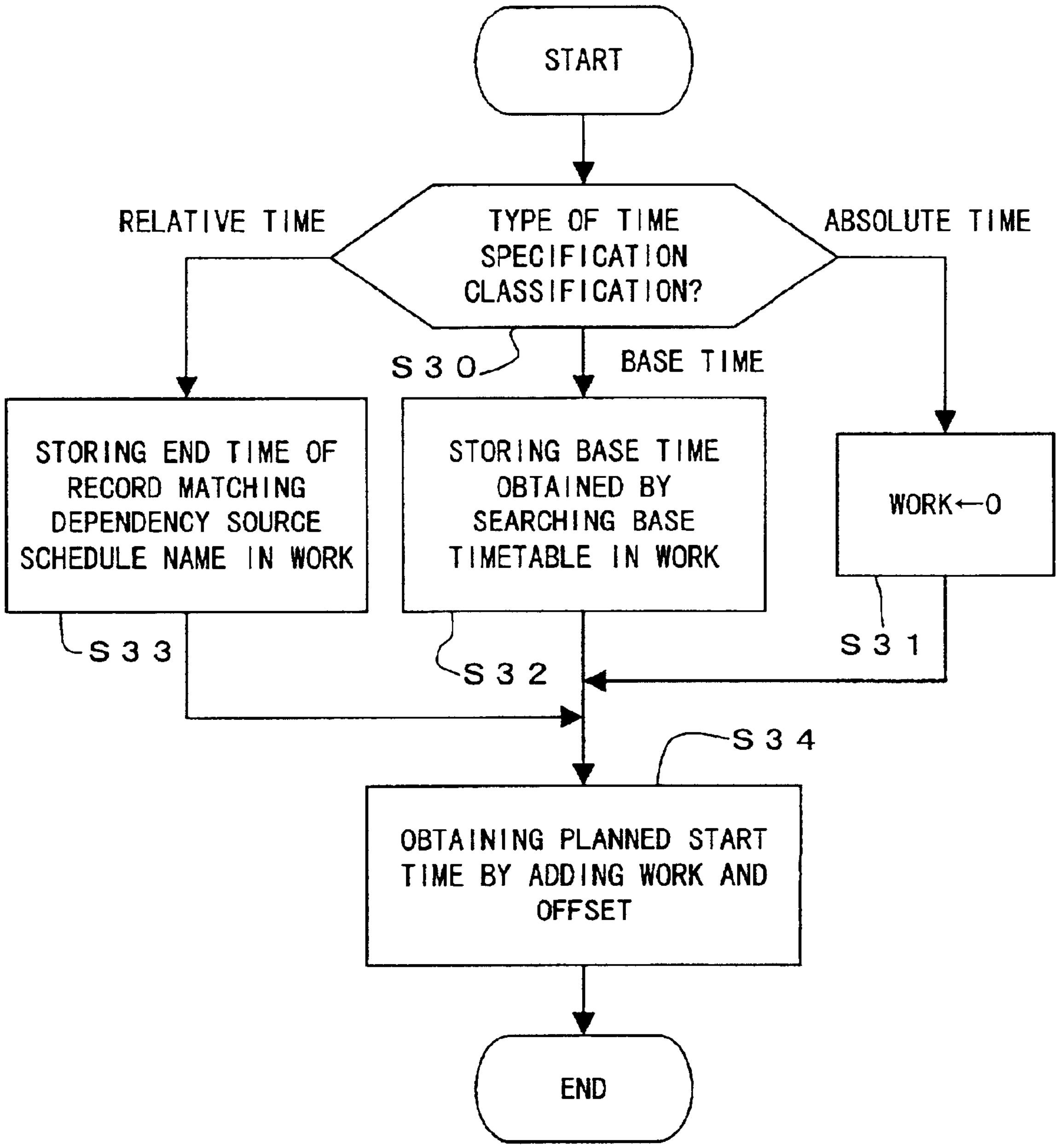
FIG. 13 is a flowchart showing the details of a planned start time setting process.

FIG. 13 is a flowchart showing the details of step S26 shown in FIG. 12, that is, the planned start time setting process. Once the process is started in this figure, start time specification classification is determined. If the start time specification classification is the absolute time specification, "0" is assigned to a working memory (WORK) in step S31. If the start time specification classification is the base time specification, the base timetable 38 is searched, and the searched base time is stored in the WORK in step S32. If the start time specification classification is the relative time specification, the end time of the record corresponding to a dependency source schedule name is stored in the WORK in step S33.

The contents of the working memory WORK and an offset are added to obtain the planned start time in step S34 after the process in step S31, S32, or S33 is performed. Here, the planned start time setting process is terminated.

Figure 14:
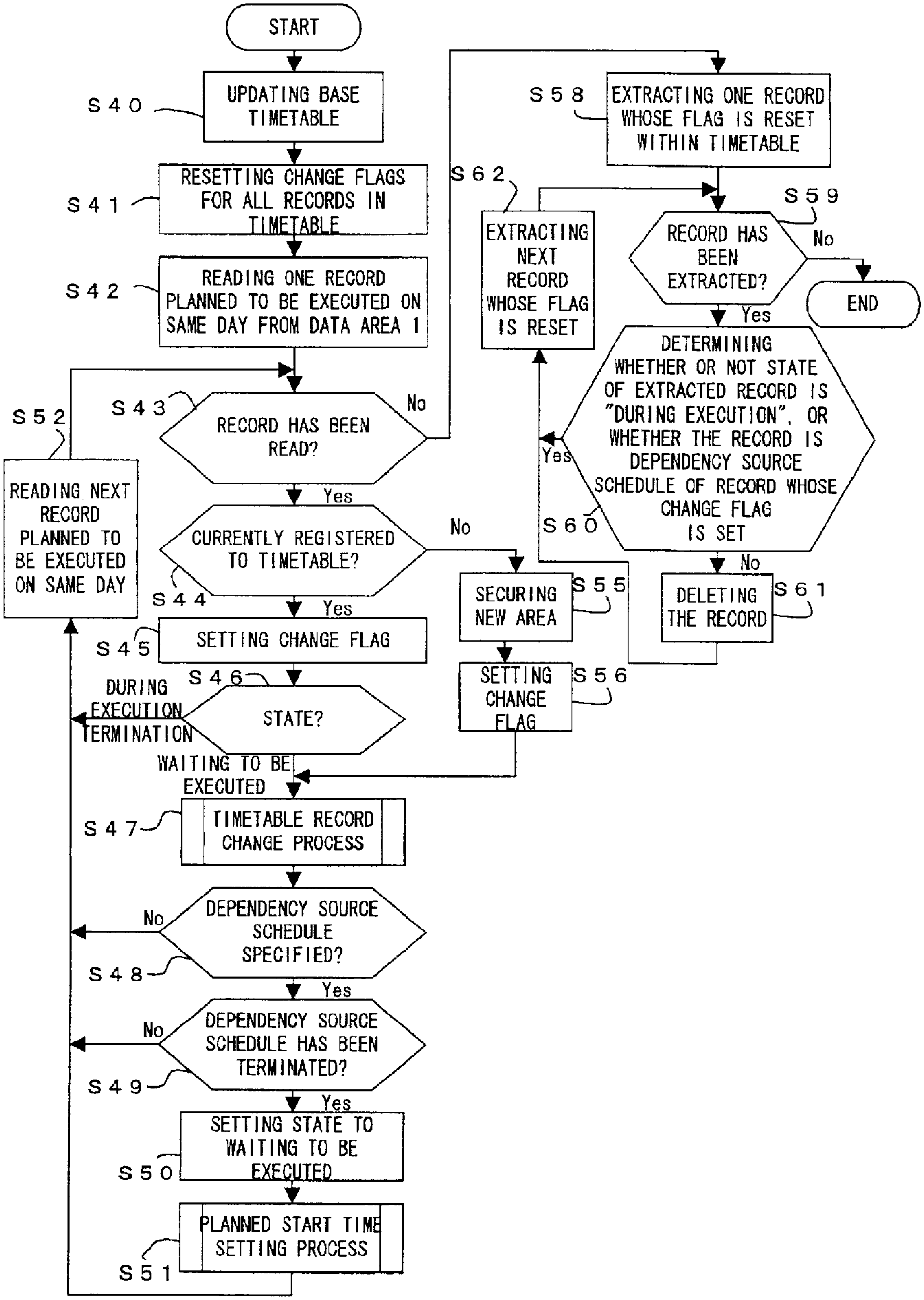
FIG. 14 is a flowchart showing the details of a timetable update process 1.

FIG. 14 is a flowchart showing the details of step S6 shown in FIG. 10, that is, the timetable update process 1. This is a process for updating the contents stored in the timetable 39 along with the base timetable 38 by using the contents of the schedule information file 33, for example, in correspondence with a periodical reread once in a day, or the schedule information change notification from the schedule reserving unit 31.

Once the process is started in FIG. 14, the contents of the base timetable 38 are updated in step S40. Next, change flags for all of the records stored in the timetable 39 are reset in step S41. Then, one record planned to be executed on the same day among the records stored in the schedule table in the schedule information file 33, namely, the data area 1 is read, for example, from the beginning of the table in step S42.

Then, it is determined whether or not the record has been read in step S43. If it is determined that the record has been read, it is further determined whether or not the read record has the same schedule name as any of the records registered to the timetable 39, and corresponds to the currently registered record in step S44. If the read record corresponds to the currently registered record, the change flag of this record is set in step S45, and the state of the record stored in the timetable 39 is determined in step S46.

If the state of the record is "waiting to be executed" or "waiting for dependency source schedule termination", the record can be updated. Then, the timetable record change process, namely, the process shown in FIG. 12 is performed in step S47.

In step S48, it is determined whether or not a dependency source schedule is specified within the updated record. If the dependency source schedule is specified, it is further determined whether or not the dependency source schedule has been terminated in step S49. If the dependency source schedule has been terminated, the state of the updated record is set to "waiting to be executed" in step S50. Then, the planned start time setting process, namely, the process shown in FIG. 13 is performed in step S51. The next record planned to be executed on the same day is read from the schedule table in step S52. The processes in and after step S43 are then repeated.

If the record planned to be executed on the same day, which is read from the schedule table, does not correspond to the record currently registered to the timetable 39 in step S44, a new area is secured in the timetable 39 in step S55, and the change flag is set in step S56. The processes in and after step S47 are then repeated.

If the state of the record currently stored in the timetable 39 is "during execution" or "termination" in step S46, update of the record at a periodical reread, for example, once in a day is meaningless. Therefore, the processes in and after step S52 are repeated without performing the processes in steps S47 through S51. Additionally, the processes in and after step S52 are repeated without performing the processes in steps S49 through S51 if the dependency source schedule is not specified in step S48, or without performing the processes in steps S50 and S51 if the dependency source schedule has not been terminated yet in step S49.

If it is determined that the record has not been read in step S43, this means that all the records planned to be executed on the same day have been read among the records stored in the schedule table. Accordingly, one record whose change flag is reset is extracted from among the records stored in the timetable 39 in step S58, and it is determined whether or not the record has been extracted in step S59. If the record has been extracted, it is further determined whether or not the state of the extracted record is "during execution", or whether the record is a dependency source schedule of either an updated record or a newly stored record whose change flag is set within the timetable. If it is determined that the extracted record is not the dependency source schedule described above, there is no need to leave this record in the timetable 39. Therefore, this record is deleted from the timetable 39 in step S61. The next record whose change flag is reset is then extracted in step S62, and the processes in and after step S59 are repeated.

If it is determined that the state of the extracted record is "during execution", or the extracted record is specified as the dependency source schedule of either an updated record or a newly stored record within the timetable 39, the processes in and after step S62 are repeated without performing the process in step S61. The timetable update process 1 is terminated when it is determined that the record whose change flag is reset is not extracted in step S59.

Figure 15:
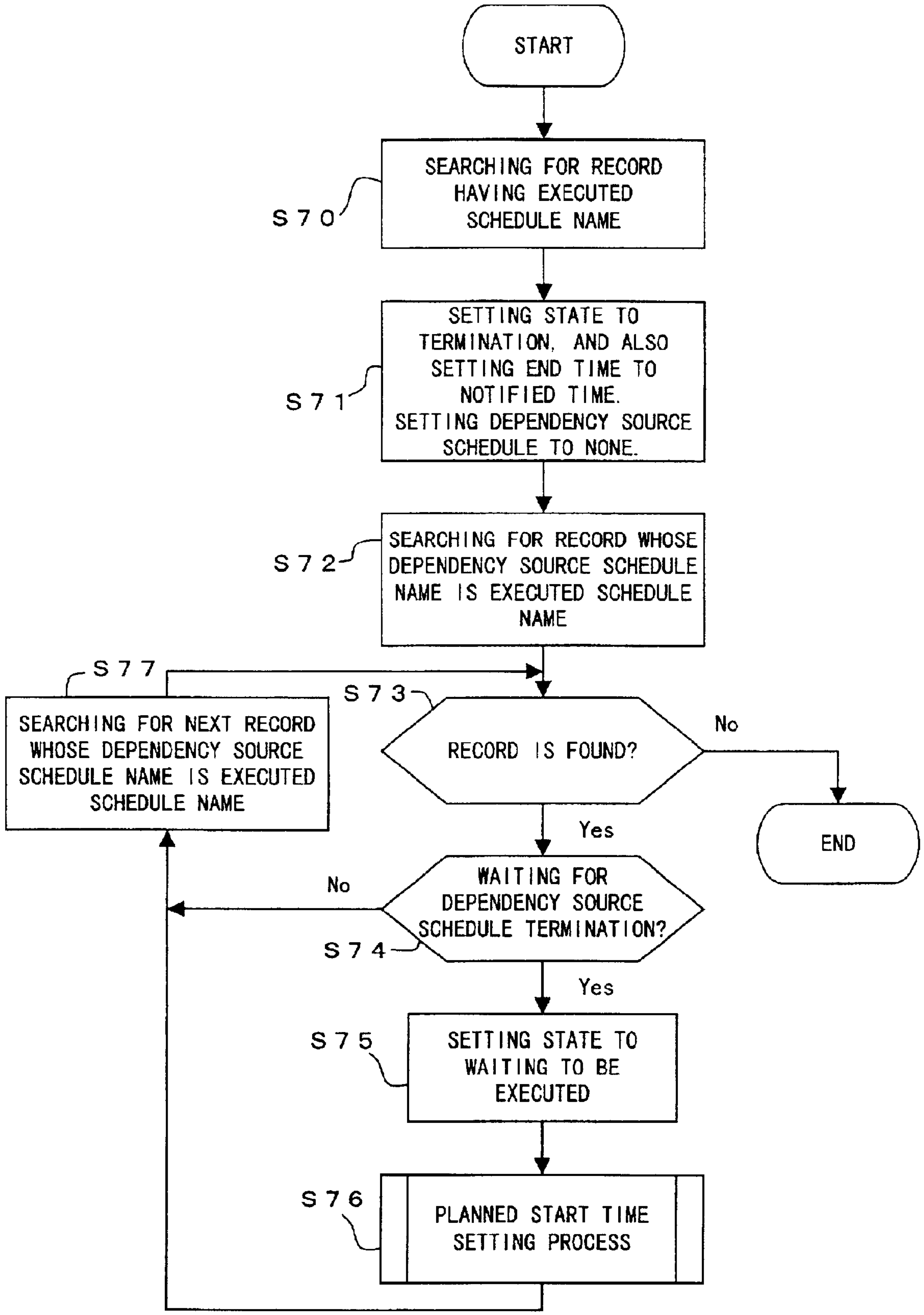
FIG. 15 is a flowchart showing the details of a timetable update process 2.

FIG. 15 is a flowchart showing the details of step S7 shown in FIG. 10, that is, the timetable update process 2. This is a process performed when an execution result is transmitted from the execution threads to the request processing unit 36 upon termination of the execution of a schedule in FIG. 4 as described above.

Once the process is started in FIG. 15, the record having the name of an executed schedule transmitted as an execution result is searched in the timetable 39 in step S70. The state of the searched record is set to "termination", the end time is set to the time notified from the execution threads, and the dependency source schedule name is set to "none" in step S72. The record whose dependency source schedule name matches the name of the executed schedule returned as the execution result is searched among the records whose dependency source schedules are specified in the timetable 39.

It is determined whether or not such a record is found in step S73. If such a record is found, it is further determined whether or not the state of the record is still "waiting for dependency source schedule termination" in step S74. If the state is determined to be the "waiting for dependency source schedule termination", it is changed to the "waiting to be executed" in step S75. This is because the dependency source schedule of the searched record has been terminated. Then, the planned start time setting process, that is, the process shown in FIG. 13 is performed in step S76. The next record whose dependency source schedule is specified as the executed schedule is searched in a similar manner as in step S77. The processes in and after step S73 are then repeated.

If the state of the searched record is determined not to be the "waiting for dependency source schedule termination" in step S74, the processes in and after step S77 are repeated without performing the processes in steps S75 and S76. The timetable update process 2 is terminated when the record whose dependency source schedule is specified as the name of the executed schedule being the execution result is not found in step S73.

Next, a specific example of schedules and their execution progress are explained by referencing FIGS. 16 through 19. FIG. 16 exemplifies schedules. Although six schedules S1 through S6 are shown, their record lengths, existing attribute information, and schedule contents are omitted in this figure. It is assumed that execution period of each schedule is, for example, 30 minutes.

Figure 17:
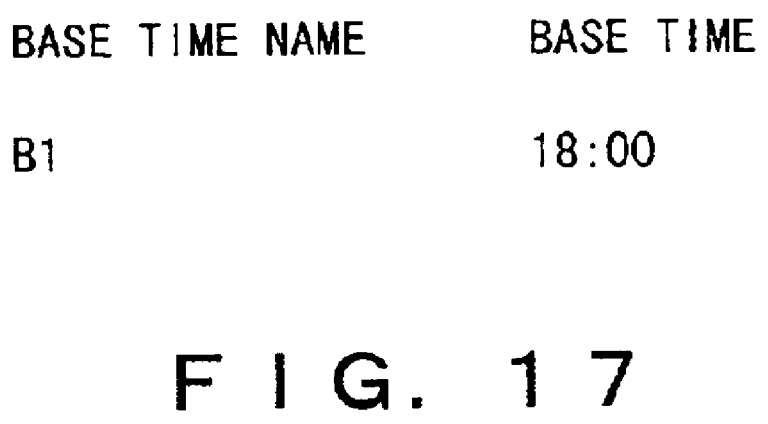

FIG. 17 exemplifies the contents of the base time information table, namely, the data area 2 of the schedule information file 33. This figure shows that a base time having a base time name B1 is 18:00 on an absolute time basis.

FIG. 18 shows the execution progress of the schedules when the base time is not changed. Here, assume that the read operation of the schedule information file 33 by the request processing unit 36 is terminated, for example, at 16:00.

For the schedules S1, S3, and S6 whose dependency source schedules are not specified, their planned start times are determined in correspondence with the absolute time specification or the base time specification method, when the schedule information file 33 is read. The determined planned start times are registered to the timetable 39, and these schedules immediately enter the state of "waiting to be executed". The schedules are respectively executed at the planned start times.

The schedules S2, S4, and S5 whose dependency source schedules are specified enter the state of "waiting for dependency source schedule termination", when the schedule information file 33 is read. Since the dependency source schedule of S2 among these schedules is S1, the planned start time of S2 is set to 19:40 with the absolute time specification method at 19:30 when S1 is terminated. S1 therefore enters the state of "waiting to be executed", and its execution is started at that planned start time.

Also the dependency source schedule of S4 is S1, and the planned start time of S4 is set to 18:40 in the timetable 39 by making a calculation with the base time specification method at the termination point of S1, namely, at 19:30. However, since the planned start time is already past, the execution of S4 is started at the timing when the schedule execution managing unit 37 references the timetable 39 next, for example, at 19:30:30 if the reference is made at every 30 seconds. Furthermore, the dependency source schedule of S5 is S3, and the planned start time of S5 is set to 19:10 in the timetable 39 at 18:50 when S3 is terminated, by making a calculation with the relative time specification method. As a result, the execution of S5 is started at the set start time.

FIG. 19 shows the execution progress of the schedules when a base time having a base time name B1 is changed to 19:00, for example, at 16:30. The planned start times of the schedules S1, S3, and S6 whose dependency source schedules are not specified are determined when the schedule information file 33 is read, and they start to be executed at their planned start times in a similar manner as in FIG. 18. The execution start of S1 is the same as that in FIG. 18, but the execution starts of S3 and S6 are one hour behind.

For the schedules S2, S4, and S6 whose dependency source schedules are specified, they enter the state of "waiting for dependency source schedule termination" when the schedule information file 33 is read, in a similar manner as in FIG. 18. The start time of S2 is the same as that in FIG. 18.

For the schedule S4, its planned start time is set to 19:40 in the timetable 39 at 19:30 when S1 is terminated, in a similar manner as in FIG. 18. Consequently, its start is 10 minutes (more precisely, 9 minutes and 30 seconds) behind FIG. 18.

For the schedule S5, its dependency source is S3, and the termination of S3 is one hour behind FIG. 18. Therefore, the planned start time of S5 is set to 20:10 in the timetable 39 at the termination point of S3, namely, 19:50. Consequently, the execution start of S5 is one hour behind FIG. 18.

With such a change in the base time B1, not only the planned start time of S6 whose offset from the base time is 0, but also the planned start times of S3, S4, and S5 are automatically changed in synchronization. Namely, for a group of schedules for which base time specification is made by using the same base time as a criterion, the planned start times of all of the schedules can be changed by altering only the base time.

Furthermore, although the start time of S3 is changed and its termination is one hour behind, the time interval from when S3 is terminated until when S5 being the dependency destination schedule is started remains unchanged even after the base time is changed. Namely, a group of schedules, for which the relative time specification is made, can be executed while maintaining an originally planned execution interval after a dependency source schedule is terminated, even if a change in the start time or the execution time of the dependency source schedule occurs.

Explained last is the loading of a program for implementing a schedule execution management according to the present invention into a computer. A schedule execution managing apparatus according to the present invention can be configured by a general computer such as the server 10 shown in FIG. 2, or the computer 20 shown in FIG. 3. FIG. 20 shows the configuration of such a computer. A computer 51 is configured by a main body 52 and a memory 53.

As the memory 53, various storage devices such as a random access memory (RAM), a hard disk, a magnetic disk, etc. are available. In such a memory 53, a program corresponding to the schedule reserving unit 31 or the schedule executing unit 32, which is shown in FIG. 4, a program represented by the flowcharts of FIGS. 10 through 15, etc. are stored. The programs are executed by the main body 52, so that the schedule execution management according to the present invention can be implemented.

The programs for implementing the present invention can be executed by being loaded from a program provider side to the computer 51 via a network 54, or by being stored onto a marketed and distributed portable storage medium 55 and loaded into the computer 51. As the portable storage medium 55, storage media in various forms such as a CD-ROM, a floppy disk, an optical disk, a magneto-optical disk, etc., are available. The above described programs are stored onto such a storage medium, and executed by the computer 51, whereby the schedule execution management according to the present invention can be implemented.

Up to this point, the preferred embodiments according to the present invention have been described in detail. However, preferred embodiments according to the present invention are not limited to the above described embodiments, and various embodiments can be implemented within the scope of the claims. By way of example, the schedule information file is configured by the data areas 1 and 2 in FIG. 5. However, the data areas 1 and 2 may be configured as separate files as a matter of course. Furthermore, schedule contents may be stored in a separate file in order to make the length of a record stored in these data areas fixed. Or, such a file is stored in the form of a database, thereby using a database management system (DBMS) in order to search the database. As a result, a search in the timetable or schedule information is facilitated.

As described above in detail, according to the present invention, if a schedule A is started while maintaining a predetermined time interval after a schedule B is terminated, the time interval until the execution start of the schedule A can be maintained even if the start time, the execution time, etc. of the schedule B are changed. Accordingly, a schedule change in an emergency, for example, during the management of a train service schedule, etc. is facilitated. Also, if the definition of a schedule is reused in a different environment, the start times of all of schedules can be automatically changed by altering, for example, only a base time. This significantly contributes to an improvement in practicability of the schedule execution managing system.

While the invention has been described with reference to the preferred embodiments thereof, various modifications and changes may be made to those skilled in the art without departing from the true spirit and scope of the invention as defined by the claims thereof.

What is claimed is:

1. A schedule execution managing apparatus implemented by a computer managing execution of one or more schedules, comprising:

a planned start time setting unit setting a planned start time of a schedule which is to be determined by specifying a base time name having a corresponding base time and an offset from said base time, where said base time name base time and offset are stored in a storage;

a planned start time storing unit storing the set planned start time; and a schedule execution controlling unit controlling an execution start of the schedule by referencing contents stored in said planned start time storing unit, wherein the base time having a base time name and said schedule execution managing apparatus managing execution of one or more schedules using one or more base time names.

2. A schedule execution managing apparatus implemented by a computer managing execution of one or more schedules, comprising:

a planned start time setting unit setting a planned start time of a schedule which is to be determined by specifying a base time name having a corresponding base time and an offset from said base time, where said base time name, base time and offset are stored in a storage;

a planned start time storing unit storing the set planned start time; and a schedule execution controlling unit controlling an execution start of the schedule by referencing contents stored in said planned start time storing unit, wherein the e time having a base time name and said schedule execution managing apparatus managing execution of one or more schedules using one or more base time names; and a planned start time changing unit changing a planned start time of a schedule when it is determined that the schedule uses a base time name, the changing using the changed base time and the offset, when the base time is changed, and rewriting the planned start ti e stored in said planned start time storing unit.

3. A schedule execution managing apparatus implemented by a computer managing execution of a plurality of schedules, comprising:

a planned start time setting unit setting a first planned start time for a first schedule by specifying a first offset from an end time of a second schedule where a start time of the second schedule is specified by a base time name having a corresponding base time an a second offset from said base time, where said base time name, base time and offsets are storage, wherein the first schedule having a dependency on the second schedule;

a planned start time storing unit storing the first planned start time, the second planned start time and the offset time;

a schedule execution control unit controlling an execution start of the first and second schedules by referencing contents stored in said planned start time storing unit;

a detecting unit detecting an end time of the execution of the second schedule; and a planned start time updating unit updating the first planned start time stored in said planned start time storing unit based on the detected end time and the stored offset time.

4. A schedule execution managing apparatus implemented by a computer managing execution of one or more schedules, comprising:

a planned start time setting unit setting a first planned start time for a first schedule by specifying a first offset an end time of a second schedule where a start time of the second schedule is specified by a base time name having a corresponding base time and second offset from said base time, where said base time name, base time and offsets are stored in a storage;

a planned start time storing unit storing the first planned start time, the second planned start time and the offset time; and a schedule execution control unit controlling an execution start of the first and second schedules by referencing contents stored in said planned start time storing unit, and a planned start time changing unit changing the planned start time of the first schedule which is determined that it has the dependency on the second schedule using the changed end time and the offset, when the end time of the second schedule is changed, and rewriting the planned start time stored in said planned start time storing unit.

5. A schedule execution managing method implemented by a computer managing execution of one or more schedules, comprising:

setting a planned start time of a schedule which is to be determined by specify a base time name having a corresponding base time and an offset from said base time, where said base time name, base time and offset are stored in a storage;

storing the set planned start time; and controlling an execution start of the schedule by referencing the stored planned start time, wherein the base time having a base time name and said schedule execution managing method managing execution of one or more schedules using one or more base time names.

6. A schedule execution managing method implemented by a computer managing execution of one or more schedules, comprising:

setting a planned start time of a first schedule which is to be determined by specifying a first offset from an end time of a second schedule where a start time of the second schedule is specified by a base time name having a corresponding base time and a second offset from said base time, where said base time name, base time and offsets are stored in a storage wherein the first schedule having a dependency on the second schedule;

storing the set planned start time; and controlling an execution start of the first schedule by referencing the stored planned start time;

resetting a planned start time of a schedule which is determined that the schedule uses a base time name using the changed base time and the offset, when the base time changed;

storing the reset planned start time; and controlling an execution start of the schedule by referencing the stored planned start time.

7. A schedule execution managing method implemented by a computer managing execution of one or more schedules, comprising:

setting a planned start time of a first schedule which is to be determined by specifying a base time name having a corresponding base time and an offset from said base time, where said base time name, base time and offset are stored in a storage, wherein the first schedule having a dependency on the second schedule;

storing the set planned start time; and controlling an execution start of the first schedule by referencing the stored planned start time.

8. A schedule execution managing method implemented by a computer managing execution of one or more schedules, comprising:

setting a planned start time of a first schedule by specifying a first offset from an end time of a second schedule where a start time of the second schedule is specified by a base time name having a corresponding base time and a second offset from said base time, where said base time name, base time and offsets are stored in a storage, wherein the first schedule having a dependency on the second schedule;

storing the set planned start time; and controlling an execution start of the first schedule by referencing the stored planned start time; resetting the planned start time of the first schedule which is determined that it has the dependency on the second schedule using the end time after change and the offset from the end time, when the end time of the second schedule is changed;

storing the reset planned start time; and controlling an execution start of the first schedule by referencing the stored planned start time.

9. A computer-readable storage medium on which is recorded a program for causing a computer to execute a process for managing execution of one more schedules, said process comprising:

setting a planned start time of a schedule which is to be determined by specifying a base time name having a corresponding base time and an of the from said base time, where said base time name, base time and offset are stored in a storage;

storing the set planned start time; controlling an execution start of the schedule by referencing the stored planned start time, wherein the base time having a base time name and said process for managing execution of one or more schedules using one or more base time names;

resetting a planned start time of a schedule which is determined that is uses a base time name using the changed base time and the offset, when the base time is changed;

storing the reset planned start time; and controlling an execution start of the schedule by referencing the stored planned start time, so that event schedules are changed only when the planned start time requires changes.

10. A computer-readable storage medium on which is recorded a program for causing a computer to execute a process for managing execution of one or more schedules, said process comprising:

setting a planned start time of a first schedule which is to be determined by specifying a first offset from an end time of a second schedule where a start time of the second schedule is specified by a base time name having a corresponding base time and a second offset from said base time, where said base time name, base time and offsets are stored in a storage, wherein the first schedule having a dependency on the second schedule;

storing the set planned start time;

controlling an execution start of the first schedule by referencing the stored planned start time;

resetting the planned start time of the first schedule which is determined that it has the dependency on the second schedule using the end time after change and the offset from the end time, when the end time of the second schedule is changed;

storing the reset planned start time; and controlling an execution start of the first schedule by referencing the stored planned start time, so that event schedules are changed only when the planned start time requires changes.

11. A schedule execution managing apparatus implemented by a computer managing execution of one or more schedules, comprising:

planned start time setting means for setting a planned start time of a schedule which is to be determined be specifying a base time name having a corresponding base time and an offset from said base time, where said base time name, base time and offset are store in a storage;

planned start time storing means for storing the set planned start time;

schedule execution controlling means for controlling an execution start of the schedule by referencing contents stored in said planned start time storing means, wherein the e time having a base time name and said schedule execution managing apparatus managing execution of one or more schedules using one or more base time names; and a planned start time changing means for changing a planned start time of schedule which is determined that is uses a base time name using the changed base time d the offset, when the base time is changed, and rewriting the planned start time stored in said planned start time storing means, so that event schedules are changed only when the planned s art time requires changes.

12. A schedule execution managing apparatus implemented by a computer managing execution of one or more schedules, comprising:

planned start time setting means for setting a planned start time of a first schedule which is to be determined by specifying a first offset from an end time of a second schedule where a start time of the second schedule is specified by a base time name having a corresponding base time and a second offset from said base time, where said base time name, base time and offsets are stored in a storage, wherein the first schedule having a dependency on the second schedule;

planned start time storing means for storing the set planned start time;

schedule execution controlling means for controlling an execution start of the first schedule by referencing contents stored in said planned start time storing means; and a planned start time changing means for changing the planned start time of the first schedule which is determined that it has the dependency on the second schedule using the changed end time and the offset, when the end time of the second schedule is changed, and rewriting the planned start time stored in said planned start time storing means, so that event schedules are changed only when the planned start time requires changes.

13. A schedule execution managing method implemented by a computer managing execution of one or more schedules, comprising:

setting a planned start time of a schedule by specifying a base time name having a corresponding base time and an offset from said base time, where said base time name, base time and offset are stored in a storage;

storing the set planned start time; and controlling an execution start of the schedule by referencing the stored planned start time, wherein the base time having a base time name and said schedule execution managing method manages execution of one or more schedules using one or more base time names.

14. A schedule execution managing method implemented by a computer managing execution of two or more schedules including a first schedule and a related second schedule, comprising:

setting a planned start time of the first schedule by specifying a base time name having a corresponding base time and an offset from said base time, where said base time name, base time and offset are stored in a storage;

storing the set planned start time;

updating the related second schedule responsive to the base time name; and controlling an execution start of the first schedule by referencing the stored planned start time and controlling execution of the second schedule responsive to the updating.

* * * * *

UNITED STATES PATENT AND TRADEMARK OFFICE

CERTIFICATE OF CORRECTION

PATENT NO. : 7,039,472 B2

APPLICATION NO. : 09/814071

DATED : May 2, 2006

INVENTOR(S) : Yuichiro Sugimoto

It is certified that error appears in the above-identified patent and that said Letters Patent is hereby corrected as shown below:

On Title Page (Item 56)

First Page Column 2 (Other Publications) Line 7, change “Universit” to --University--.
First Page Column 2 (Primary Examiner) Line 1, change “JungWon” to --Jungwon--.

Column 16, Line 14, after “name” insert --,--.

Column 16, Line 31, after “time” delete “,”.

Column 16, Line 39, after “the” change “e” to --base--.

Column 16, Line 47, change “ti e” to --time--.

Column 16, Line 56, change “an” to --and--.

Column 16, Line 58, after “are” insert --stored in a--.

Column 17, Line 11, after “offset” insert --form--.

Column 17, Line 14, after “and” insert --a--.

Column 17, Line 15, after “time” delete “,”.

Column 17, Line 35, change “specify” to --specifying--.

Column 17, Line 37, after “time” delete “,”.

Column 17, Line 63, after “time” delete “is”.

Column 18, Line 41, change “of the” to --offset--.

Column 19, Line 22, after “determined” change “be” to --by--.

Column 19, Line 25, change “store” to --stored--.

Column 19, Line 32, after “the” change “e” to --base--.

Column 19, Line 37, after “of” insert --a--.

Column 19, Line 39, change “d” to --and--.

UNITED STATES PATENT AND TRADEMARK OFFICE

CERTIFICATE OF CORRECTION

PATENT NO. : 7,039,472 B2
APPLICATION NO. : 09/814071
DATED : May 2, 2006
INVENTOR(S) : Yuichiro Sugimoto It is certified that error appears in the above-identified patent and that said Letters Patent is hereby corrected as shown below:

Column 19, Line 42, change “s art” to --start--.

Signed and Sealed this

Twenty-first Day of November, 2006

JON W. DUDAS
*Director of the United States Patent and Trademark Office*